(12) United States Patent
Asai et al.

(10) Patent No.: US 9,725,004 B2
(45) Date of Patent: Aug. 8, 2017

(54) VEHICLE MOUNTING STRUCTURE OF CONTACTLESS POWER RECEPTION DEVICE

(71) Applicant: NISSAN MOTOR CO., LTD., Yokohama-shi, Kanagawa (JP)

(72) Inventors: Akihiro Asai, Kanagawa (JP); Shigeyuki Yoshida, Kanagawa (JP); Kengo Maikawa, Kanagawa (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 15/024,626

(22) PCT Filed: Aug. 12, 2014

(86) PCT No.: PCT/JP2014/071275
§ 371 (c)(1),
(2) Date: Mar. 24, 2016

(87) PCT Pub. No.: WO2015/045663
PCT Pub. Date: Apr. 2, 2015

(65) Prior Publication Data
US 2016/0243948 A1    Aug. 25, 2016

(30) Foreign Application Priority Data

Sep. 27, 2013  (JP) ................. 2013-201477
Sep. 27, 2013  (JP) ................. 2013-201507

(51) Int. Cl.
*H02M 7/44*  (2006.01)
*H02M 7/06*  (2006.01)
(Continued)

(52) U.S. Cl.
CPC .............. *B60L 11/182* (2013.01); *B60K 1/04* (2013.01); *B60L 5/00* (2013.01); *B60L 11/18* (2013.01);
(Continued)

(58) Field of Classification Search
CPC ... B60K 1/04; B60K 2001/0416; B60L 11/18; B60L 11/1803; B60L 11/182;
(Continued)

(56) References Cited

U.S. PATENT DOCUMENTS 9,296,349 B2    3/2016  Nakamura et al.
2013/0193749 A1  8/2013  Nakamura et al.
(Continued)

FOREIGN PATENT DOCUMENTS

EP    2 618 344 A1    7/2013
JP    05-336607 A     12/1993
(Continued)

*Primary Examiner* — Rexford Barnie
*Assistant Examiner* — Toan Vu
(74) *Attorney, Agent, or Firm* — Foley & Lardner LLP

(57) ABSTRACT

In this vehicle mounting structure of a contactless power reception device, a power reception-side coil that configured to be mounted on a bottom surface of a vehicle body and that has an electrically conductive wire wound with the vehicle longitudinal direction as the coil axis is attached to the vehicle body by means of a fastening member made of a magnetic body. The fastening member is disposed to the outside of the power reception-side coil in a direction perpendicular to the coil axis.

1 Claim, 19 Drawing Sheets

(51) Int. Cl.
*B60L 11/16* (2006.01)
*B60L 11/18* (2006.01)
*B60L 5/00* (2006.01)
*B60K 1/04* (2006.01)

(52) U.S. Cl.
CPC ....... *B60L 11/1803* (2013.01); *B60L 11/1824* (2013.01); *B60L 11/1833* (2013.01); *B60L 11/1877* (2013.01); *B60L 11/1879* (2013.01); *H02M 7/06* (2013.01); *H02M 7/44* (2013.01); *B60K 2001/0416* (2013.01); *B60L 5/005* (2013.01); *B60L 2210/30* (2013.01); *B60L 2210/40* (2013.01); *B60L 2240/36* (2013.01); *B60L 2250/10* (2013.01); *B60L 2250/16* (2013.01); *Y02T 10/7005* (2013.01); *Y02T 10/705* (2013.01); *Y02T 10/7072* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
CPC .............. B60L 11/1824; B60L 11/1833; B60L 11/1877; B60L 11/1879; B60L 5/00; B60L 2210/30; B60L 2210/40; B60L 2240/36; B60L 2250/10; B60L 2250/16; H02M 7/06; H02M 7/44
USPC ........................................................ 307/10.1
See application file for complete search history.

(56) References Cited

U.S. PATENT DOCUMENTS

| | | | |
|---|---|---|---|
| 2013/0300359 | A1 | 11/2013 | Nakamura et al. |
| 2014/0232331 | A1* | 8/2014 | Stamenic .............. B60L 11/182 320/108 |
| 2015/0136499 | A1* | 5/2015 | Ichikawa .............. B60L 11/182 180/54.1 |

FOREIGN PATENT DOCUMENTS

| | | |
|---|---|---|
| JP | 10-109548 A | 4/1998 |
| JP | 2011-217452 A | 10/2011 |
| JP | 2012-228123 A | 11/2012 |
| JP | 2012-257446 A | 12/2012 |
| WO | WO 2012/105040 A1 | 8/2012 |

\* cited by examiner

US 9,725,004 B2

VEHICLE MOUNTING STRUCTURE OF CONTACTLESS POWER RECEPTION DEVICE

TECHNICAL FIELD

The present invention relates to a vehicle mounting structure of a contactless power reception device including a power reception-side coil that contactlessly receives power transmitted from a power feeding-side coil.

BACKGROUND ART

Patent Literature 1 discloses a technology to charge a battery mounted on a bottom surface of a vehicle body by supplying power by electromagnetic induction to a power reception-side coil mounted on the bottom surface of the vehicle body from a power transmission-side coil disposed on the road.

CITATION LIST

Patent Literature

Patent Literature 1: Japanese Patent Application Publication No. 2011-217452

SUMMARY OF INVENTION

Technical Problem

Incidentally, a fastening member such as a bolt, for example, is generally used to mount the power reception-side coil on the bottom surface of the vehicle body of the vehicle that contactlessly receives power supply as described above. It is preferable that the fastening member is made of iron, which has high toughness, to firmly fix the heavy power reception-side coil to the bottom surface of the vehicle body.

However, since the iron fastening member is a magnetic member, a magnetic flux generated in the power reception-side coil during power reception passes through the fastening member, which is the magnetic member, and generates eddy currents, which may heat up the fastening member.

Therefore, it is an object of the present invention to suppress the magnetic fastening member from being heated by the magnetic flux generated in the power reception-side coil even when the fastening member for attaching the power reception-side coil to the bottom surface of the vehicle body is made of a magnetic body.

Solution to Problem

An aspect of the present invention provides a vehicle mounting structure of a contactless power reception device in which a power reception-side coil that is configured to be mounted on a bottom surface of a vehicle body and that has an electrically conductive wire wound with the vehicle longitudinal direction as the coil axis is attached to the vehicle body by means of a fastening member made of a magnetic body. The fastening member is disposed to the outside of the power reception-side coil in a direction perpendicular to the coil axis.

DESCRIPTION OF EMBODIMENTS

With reference to the drawings, embodiments of the present invention are described in detail below.

First Embodiment

Figure 1:
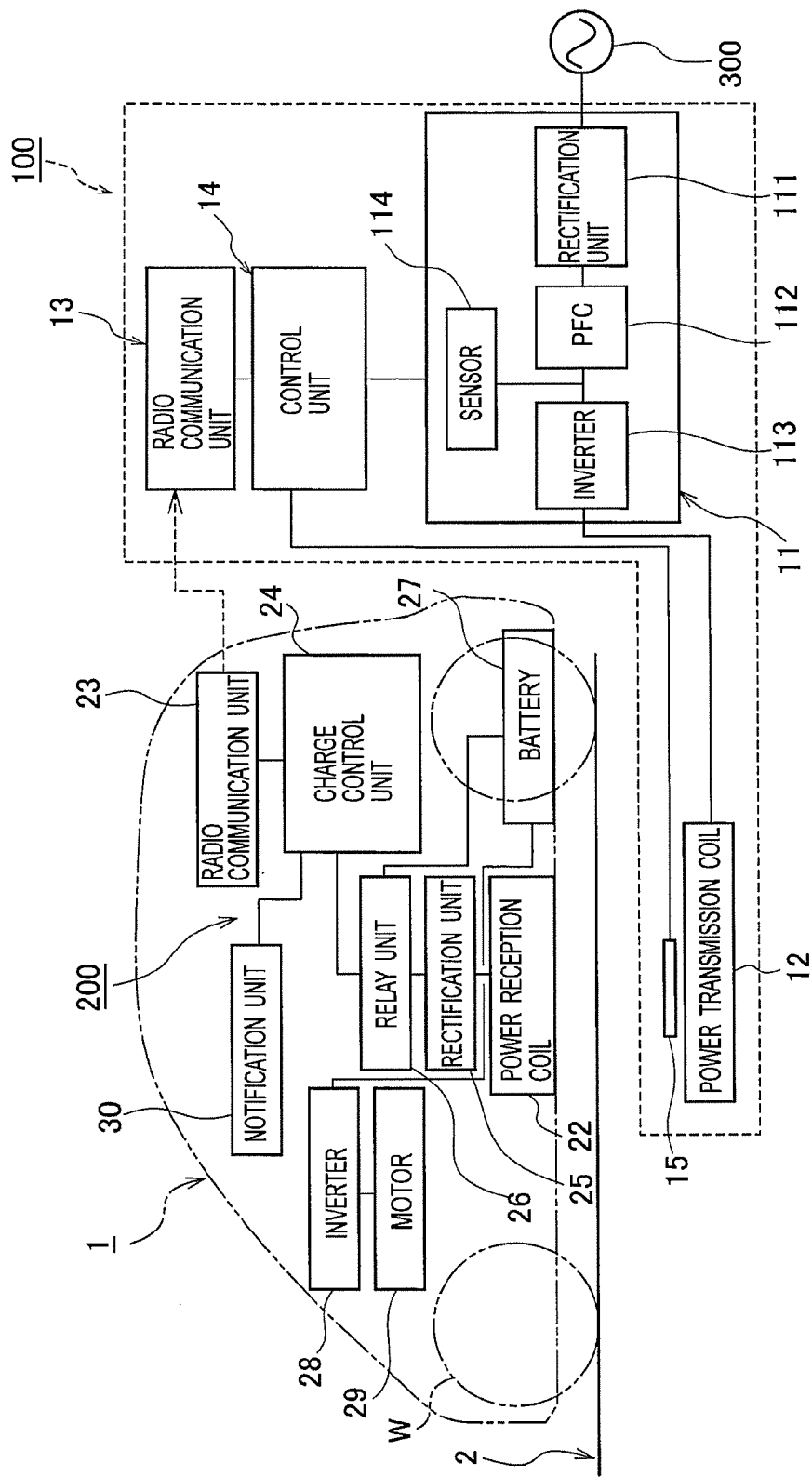
FIG. 1 is an overall configuration diagram schematically showing a contactless power feeder including a vehicle mounting structure of a contactless power reception device according to a first embodiment of the present invention.

A contactless power feeder according to a first embodiment shown in FIG. 1 includes a power feeding device 100 that is a ground-side unit and a power reception device 200 that is a vehicle-side unit, and is configured to contactlessly supply power to the power reception device 200 mounted on a vehicle 1 typified by an electric vehicle or a hybrid vehicle from the power feeding device 100 installed at a power feeding station or the like, and to charge an in-vehicle battery 27.

The power feeding device 100 includes a power transmission coil 12 as a power feeding-side coil disposed in a parking space 2 near the power feeding station. On the other hand, the power reception device 200 includes a power reception coil 22 installed at the bottom of the vehicle 1 so as to face the power transmission coil 12 when the vehicle 1 is parked at a predetermined position in the parking space 2.

The power transmission coil 12 constitutes a power feeding unit, mainly including a primary coil made of a conductive wire. Meanwhile, the power reception coil 22 constitutes a power reception unit, mainly including a secondary coil made of the same conductive wire. Electromagnetic induction between the two coils enables power to be contactlessly supplied from the power transmission coil 12 to the power reception coil 22.

The ground-side power feeding device 100 includes a power control unit 11, the power transmission coil 12, a radio communication unit 13 and a control unit 14.

The power control unit 11 is a circuit for converting AC power transmitted from an AC source 300 into high-frequency AC power and transmitting the high-frequency AC power to the power transmission coil 12, and includes a rectification unit 111, a PFC circuit 112, an inverter 113 and a sensor 114. The rectification unit 111 is a circuit electrically connected to the AC source 300 and configured to rectify output AC, power from the AC source 300. The PFC circuit 112 is a circuit (Power Factor Correction) for improving a power factor by shaping an output waveform from the rectification unit 111, and is connected between the rectification unit 111 and the inverter 113.

The radio communication unit 13 performs bidirectional communication with a radio communication unit 23 provided on the vehicle 1 side.

The control unit 14 is a unit that controls the entire power feeding device 100. The control unit 14 transmits a signal to the effect of starting power supply from the power feeding device 100 through the communication between the radio communication units 13 and 23, and receives a signal to the effect of wishing to receive power from the power feeding device 100 from the vehicle 1 side.

In addition, the control unit 14 performs switching control of the inverter 113 based on a detection current of the sensor 114, and controls power transmitted from the power transmission coil 12. Moreover, the control unit 14 stops the power feeding based on a detection signal from a foreign object sensor 15 during power feeding, or transmits a warning signal to the vehicle 1 side through the radio communication units 13 and 23.

A metal detection coil, for example, is used as the foreign object sensor 15. When a metal foreign object enters or intervenes in a magnetic field formed between the power transmission coil 12 and the power reception coil 22 during power feeding, a detection electric signal of the foreign object sensor 15 makes the control unit 14 immediately issue a warning or stop the power feeding, thereby preventing the occurrence of a problem such as a power feeding failure attributable to the intervention of the metal foreign object in the magnetic field.

The power reception device 200 on the vehicle 1 side includes the power reception coil 22, the radio communication unit 23, a charge control unit 24, a rectification unit 25, a relay unit 26, a battery 27, an inverter 28, a motor 29 and a notification unit 30.

When the vehicle 1 is parked at a predetermined stop position in the parking space 2, the power reception coil 22 faces the power transmission coil 12 immediately thereabove and is positioned keeping a distance from the power transmission coil 12.

The rectification unit 25 includes a rectification circuit connected to the power reception coil 22 and configured to rectify the AC power received by the power reception coil 22 to DC power.

The relay unit 26 includes a relay switch that is switched on and off by control by the charge control unit 24. Also, the relay unit 26 separates a main circuit system including the battery 27 from the power reception coil 22 and the rectification unit 25, which are included in a circuit unit for charge, by turning off the relay switch.

The battery 27 is configured by connecting secondary cells, and serves as an electric power source for the vehicle 1. The inverter 28 is a control circuit such as a PWM control circuit having a switching element such as an IGBT. The inverter 28 converts DC power outputted from the battery 27 into AC power based on a switching control signal, and supplies the AC power to the motor 29. The motor 29 includes a three-phase AC motor, for example, and serves as a drive source for driving the vehicle 1.

The notification unit 30 includes a warning lamp, a display of a navigation system, a speaker or the like, and outputs light, images, voices or the like to a user based on control by the charge control unit 24.

The charge control unit 24 is a controller for controlling the charge of the battery 27, and controls the radio communication unit 23, the notification unit 30, the relay unit 26 and the like. The charge control unit 24 transmits a signal to the effect of starting the charge to the control unit 14 through communication between the radio communication units 23 and 13.

Moreover, the charge control unit 24 is connected to an unillustrated controller for controlling the entire vehicle 1 through a CAN communication network. This controller manages the switching control of the inverter 28 and a charged state (SOC) of the battery 27. Then, when the battery is fully charged based on the charged state of the battery 27 according to the controller, the charge control unit 24 transmits a signal to the effect of terminating the charge to the control unit 14.

In the contactless power feeder according to this embodiment, high-frequency power is transmitted and received without any contact by the electromagnetic induction between the power transmission coil 12 and the power reception coil 22. In other words, when a voltage is applied to the power transmission coil 12, the power transmission coil 12 and the power reception coil 22 are magnetically coupled to each other. Accordingly, power is supplied from the power transmission coil 12 to the power reception coil 22.

Here, since the power transmission coil 12 and the power reception coil 22 described above are provided in the electromagnetic induction area, respective opposing protective housing walls of the power transmission coil 12 and the power reception coil 22 are made of a synthetic resin material so as not to interfere with the electromagnetic induction.

FIGS. 2 to 10 show mounting states of the power reception coil 22 and the battery 27 described above on the vehicle 1, i.e., a vehicle mounting structure of a contactless power reception device in a contactless charger.

The power reception coil 22 and the battery 27 are both mounted on the bottom surface of a floor panel 40 of the vehicle 1. The power reception coil 22 is a solenoid type coil, in which a coil main body 221 as a power reception-side coil to be described later has a coil axis P (see FIG. 11) extending in a vehicle longitudinal direction, and an electric wire 91 as a conductive wire is wound around the coil axis P. Namely, the power reception coil 22 includes the coil main body 221, which is mounted on the bottom surface of the vehicle body, contactlessly receives power transmitted from the power transmission coil 12, and has the electric wire 91 wound around the coil axis P with the vehicle longitudinal direction as the coil axis P.

The power reception coil 22 has its mounting position set in the center, in a vehicle width direction, of the bottom surface of a front end portion of the floor panel 40. The battery 27 is mounted occupying a large area covering from a position close to the rear side of the installation part of the power reception coil 22 to the rear of the vehicle.

Figure 2:
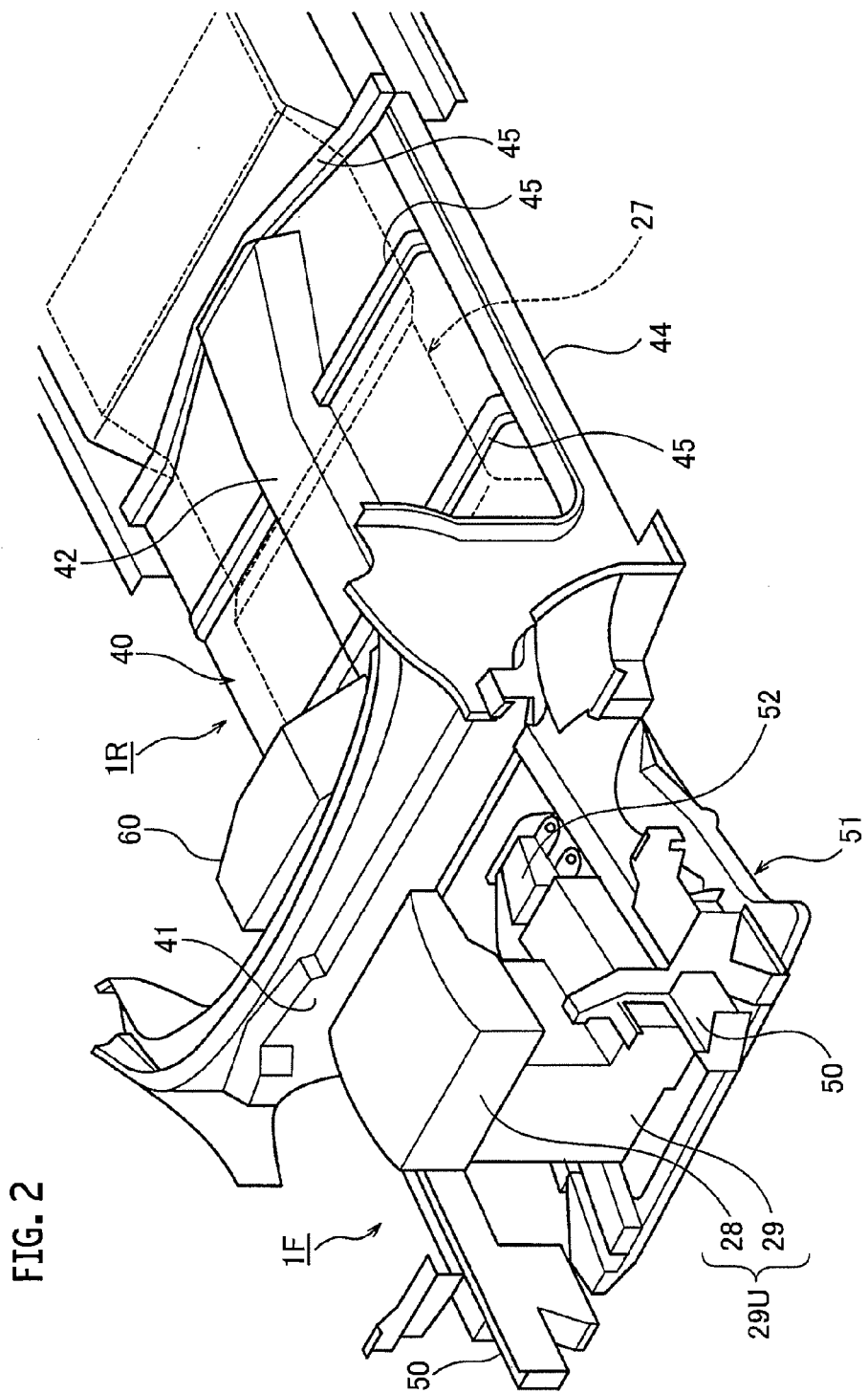
FIG. 2 is a perspective view showing a mounting layout of a battery, a motor unit and an interior auxiliary machine in the vehicle mounting structure of the contactless power reception device shown in FIG. 1.
Figure 3:
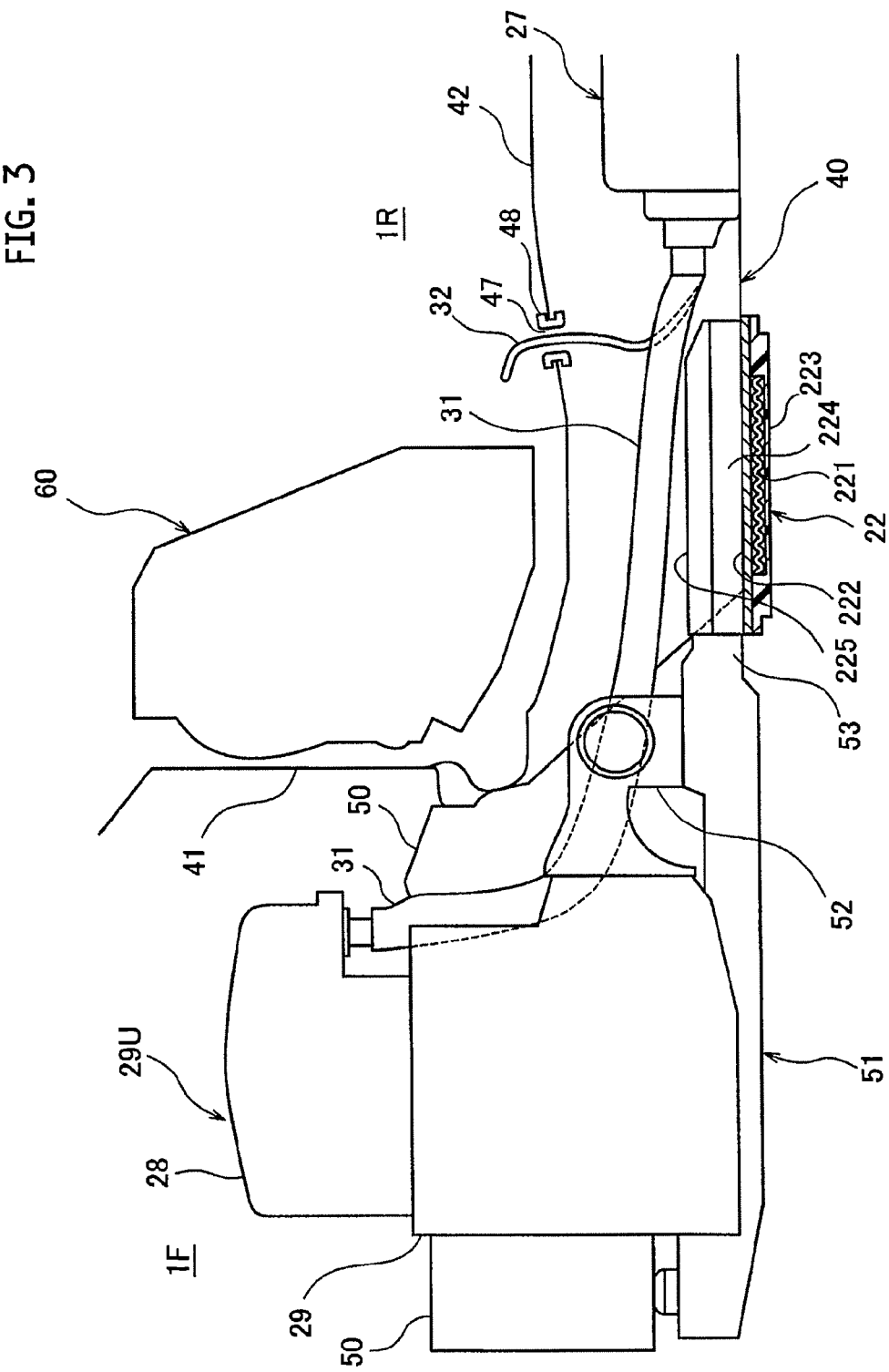
FIG. 3 is a cross-sectional view in a vehicle longitudinal direction in a vehicle center part shown in FIG. 2.

The floor panel 40 has a dash panel 41 joined at its front end, which separates a front compartment 1F from a vehicle interior 1R, and includes a tunnel part 42 in its center (vehicle center) in the vehicle width direction, which bulges toward the vehicle interior 1R and extends in the vehicle longitudinal direction (see FIGS. 2 and 3).

Along bulging bases on both sides of the tunnel part 42, stiffeners 43 having a closed cross-section are formed so as to extend in the vehicle longitudinal direction.

Figure 4:
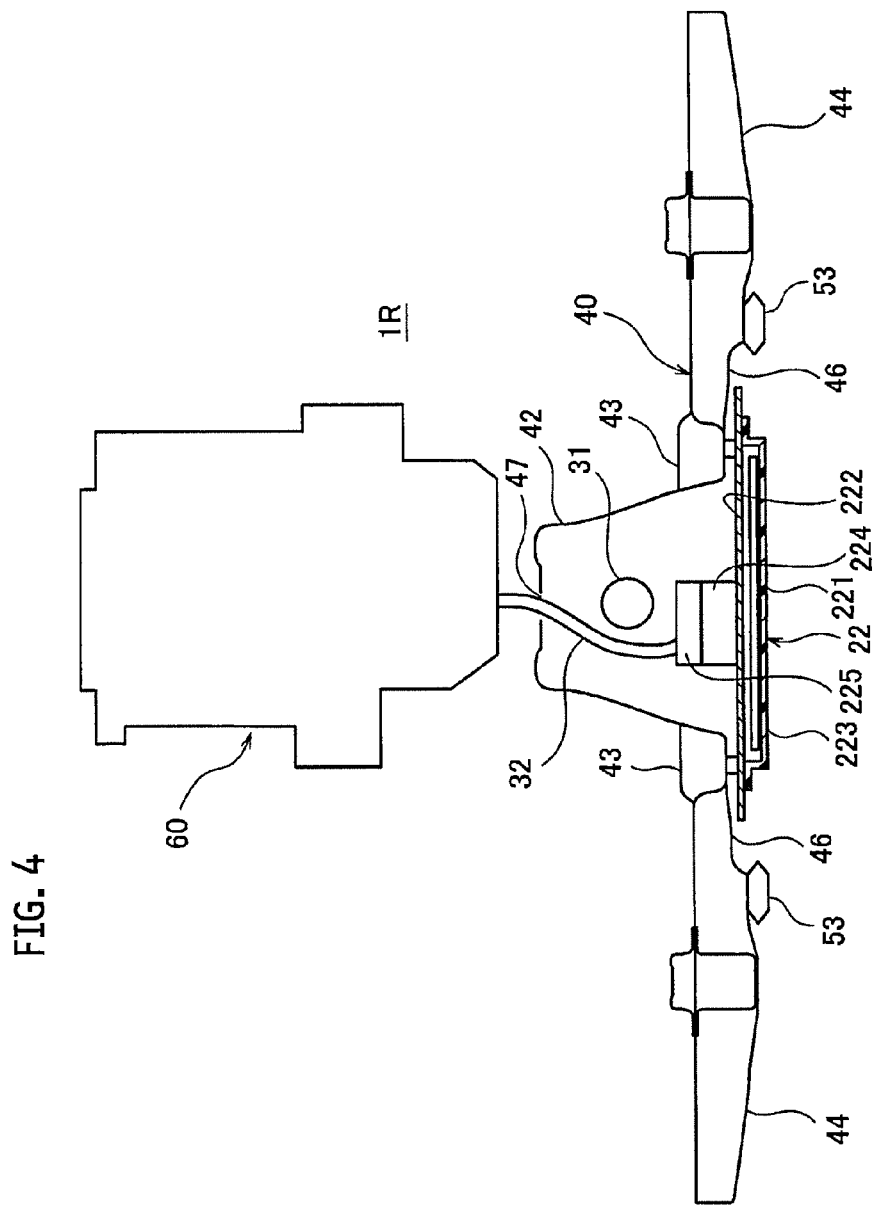
FIG. 4 is a cross-sectional view in a vehicle width direction in a power reception unit mounting portion shown in FIG. 2.
Figure 5:
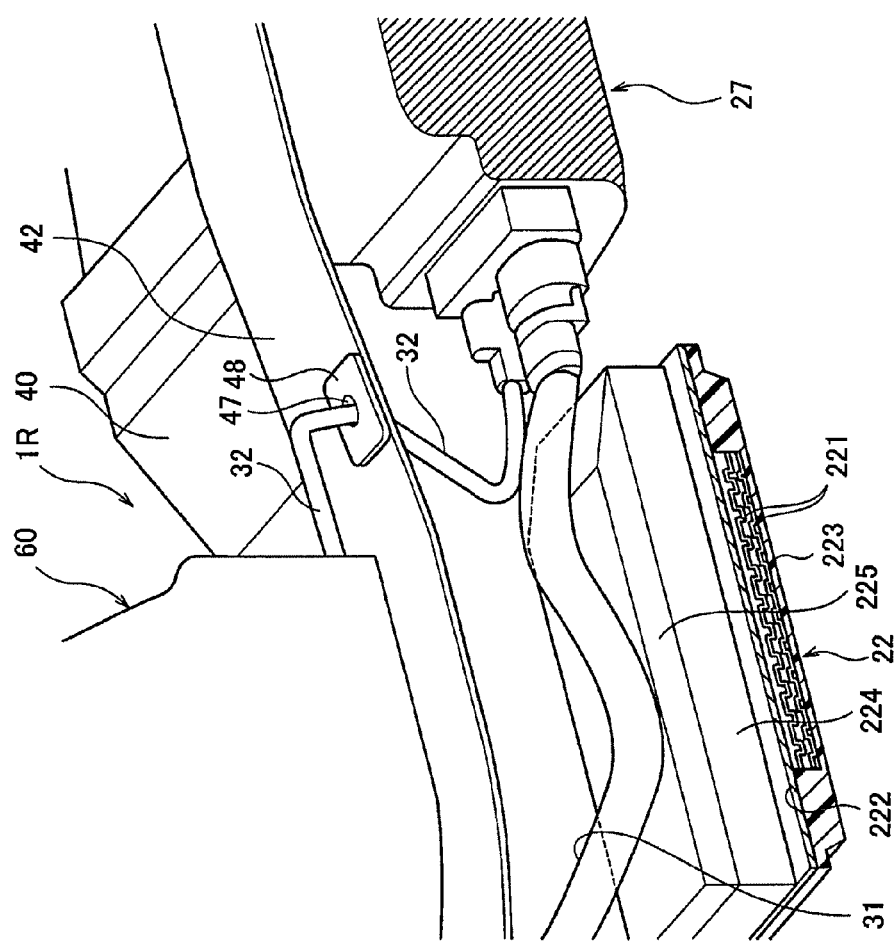
FIG. 5 is a cross-sectional perspective view showing a disposition state of the power reception unit inside a tunnel unit shown in FIG. 2.

The floor panel 40 ensures required floor rigidity by floor framework members such as the tunnel part 42, the stiffeners 43 thereof, side sills 44 provided in the vehicle longitudinal direction on both sides of the vehicle width direction, cross members 45 provided in the vehicle width direction, and outriggers 46 connecting the respective stiffeners 43 and the side sills 44 adjacent thereto at the floor front side (see FIGS. 2 to 4).

The large and heavy battery 27 is firmly fastened and fixed to the main framework members such as the side sills 44 and the cross members 45 described above and to the stiffeners 43 of the tunnel part 42.

Meanwhile, the power reception coil 22 is connected and disposed astride the lower-side opening of the tunnel part 42 at the set mounting position described above, i.e., at the center position in the vehicle width direction of the bottom surface of the front end of the floor panel 40 (see FIG. 4).

Figure 9:
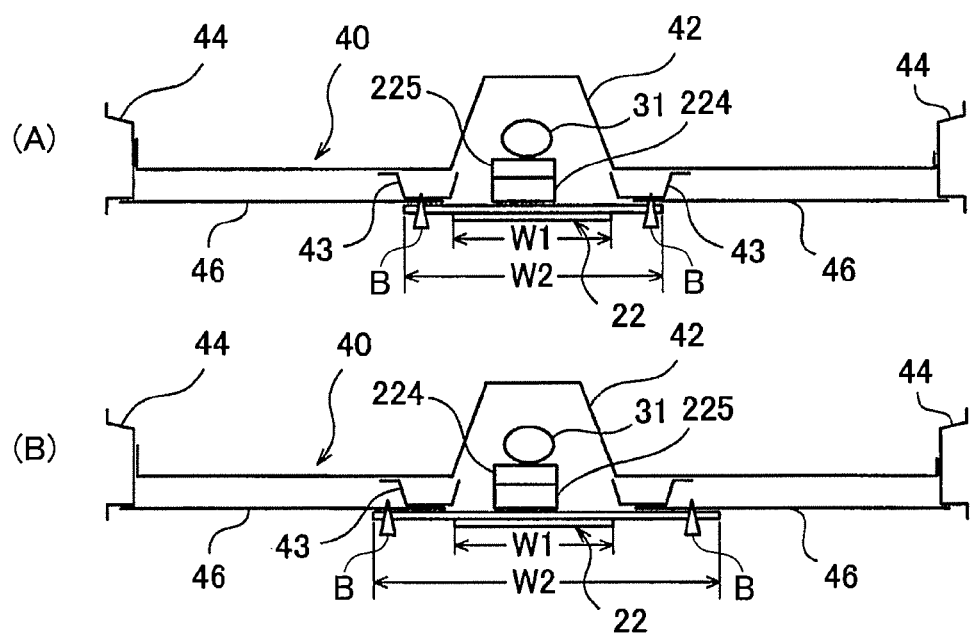
FIG. 9 is a cross-sectional view showing mounting examples (A) and (B) of the power reception unit.

In this configuration, as shown in examples (A) and (B) of FIG. 9, a width W2 of the power reception coil 22 in the vehicle width direction is set larger than a width W1 of the lower-side opening of the tunnel part 42 (W1<W2). The power reception coil 22 is connected and disposed straddling the stiffeners 43 and 43 in the lower-side opening of the tunnel part 42 or straddling the outriggers 46 and 46.

The power reception coil 22 is configured as a rectangular board including the coil main body 221 for power reception, a protective housing 222 made of non-magnetic metal such as aluminum, in which the coil main body 221 is stored and fixed, and a cover 223 that covers a lower-side opening of the protective housing 222. The cover 223 is made of appropriate synthetic resin for the reason described above so as not to interfere with the electromagnetic induction between the power transmission coil 12 and the power reception coil 22 (see FIGS. 5 and 6).

A junction box 225 storing a distribution board (distributor), a relay (the relay unit 26), a controller (the charge control unit 24) and the like is installed in the center of the upper surface of the protective housing 222. In the example shown in FIGS. 5 and 6, an electric component box 224 storing electric components such as a rectifier (the rectification unit 25) and a capacitor is provided in the center of the upper surface of the protective housing 222.

The junction box 225 is separately formed to have the same size in the projection plane as the electric component box 224, and is detachably assembled on the electric component box 224. Thus, in the power reception coil 22, the structure from the cover 223 on the lower side to the electric component box 224 on the upper side serves as a lower-side component, and the junction box 225 serves as an upper-side component.

The electric component box 224 is integrally formed with the protective housing 222, and has its inside separated from the storage portion of the coil main body 221 by a divider plate. Note that the electric component box 224 can also be formed separately from the protective housing 222.

Figure 6:
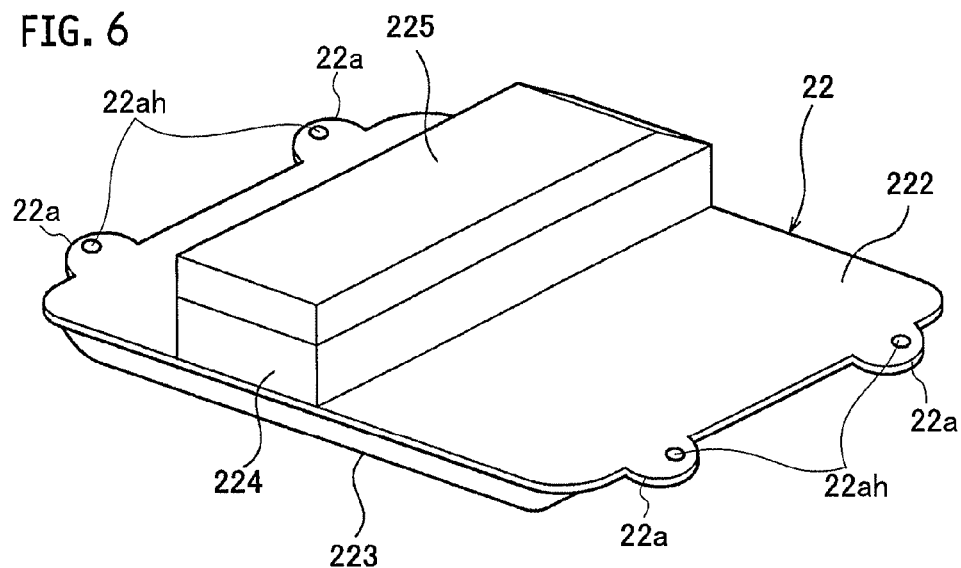
FIG. 6 is a perspective view of the power reception unit of FIG. 5.
Figure 7:
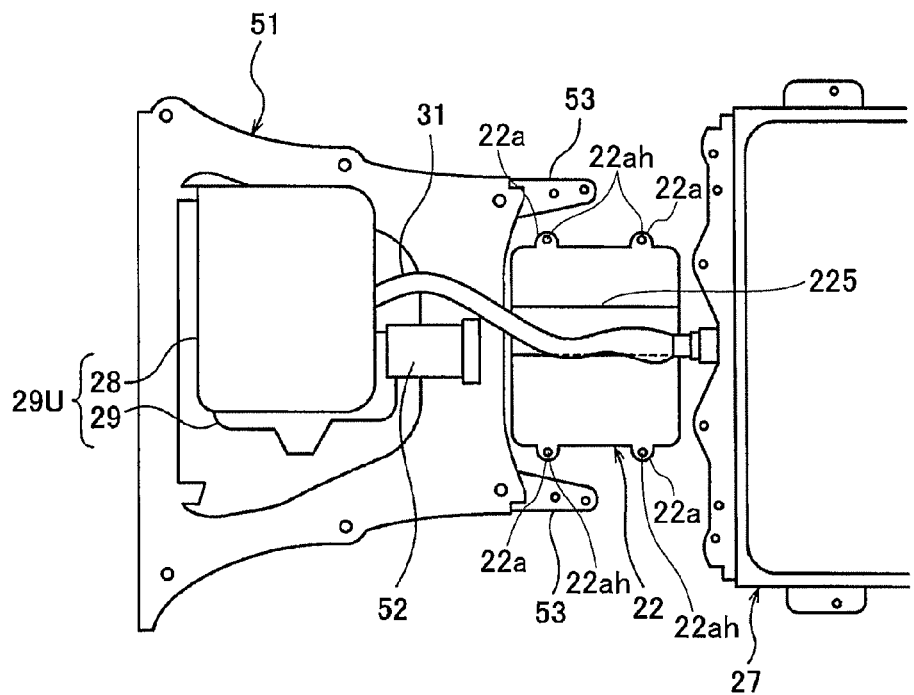
FIG. 7 is a plan view showing a mounting layout of the battery, the power reception unit and the motor unit shown in FIG. 3.
Figure 8:
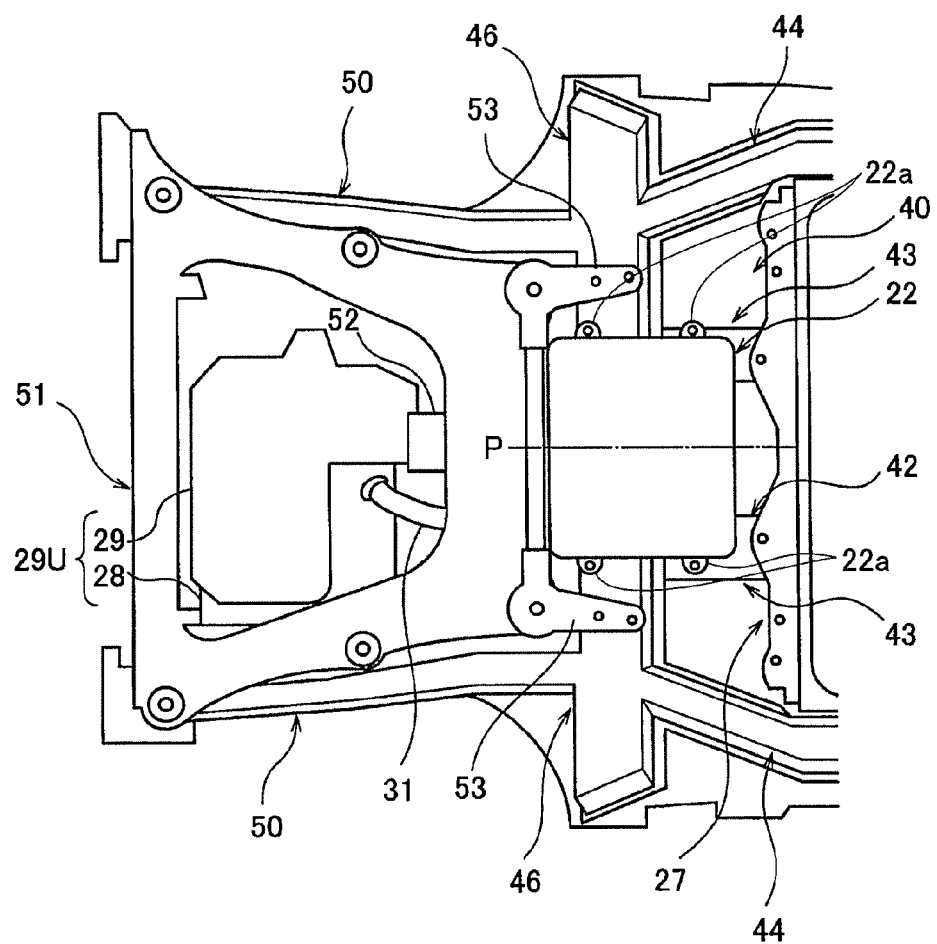
FIG. 8 is a bottom view of the mounting layout shown in FIG. 7 as seen from the bottom of the vehicle.

Here, in the power reception coil 22, as shown in FIGS. 6 to 8, attachment parts 22a for attachment to the bottom surface of the vehicle body are provided so as to protrude outward in the vehicle width direction on both sides in the vehicle width direction. The attachment parts 22a have bolt insertion holes 22ah formed therein, respectively, and bolts B shown in the examples (A) and (B) of FIG. 9 are inserted into the bolt insertion holes 22ah to fasten and fix the power reception coil 22 to the stiffeners 43 and 43 or the outriggers 46.

The bolts B are each made of iron and constitute a fastening member made of a magnetic body. The iron bolt B is excellent in toughness and fatigue durability, and is advantageous in terms of cost. Thus, the iron bolt B is particularly suitable for firmly attaching the heavy power reception coil 22, which includes the electric component box 224 and the junction box 225 on top, to the bottom surface of the vehicle body. Note that the "iron bolt" includes a carbon steel bolt and an alloy steel bolt such as chromium-molybdenum steel and stainless steel.

Figure 11:
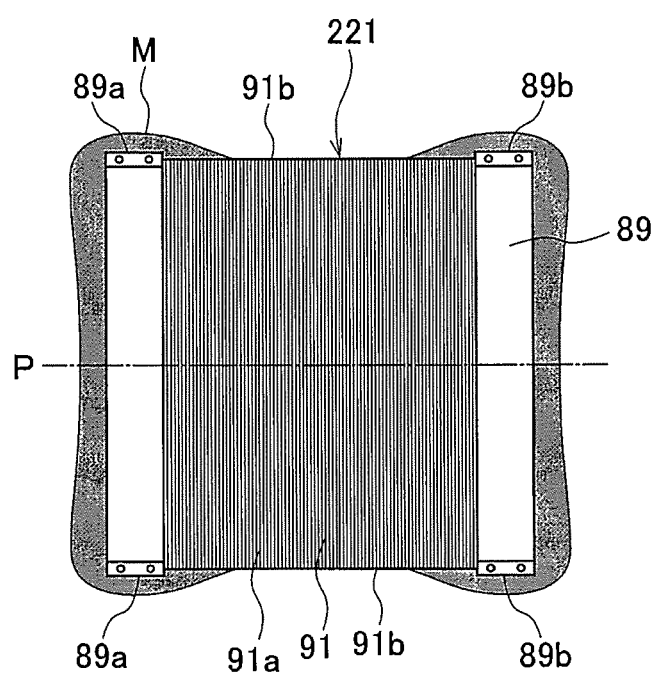
FIG. 11 is a diagram showing a magnetic flux distribution of a power reception coil.

Meanwhile, as shown in FIG. 11, the power reception coil 22 is a solenoid type coil, in which the coil main body 221 serving as the power reception-side coil has the electric wire 91 wound around a plate-shaped iron core 89 with the vehicle longitudinal direction as the coil axis P. In such a solenoid type coil, the coil axis P of the coil main body 221, i.e., the central axis of a looped portion of the electric wire 91 wound in a loop pattern corresponds to the vehicle longitudinal direction. The electric wire 91 is wound around the iron core 89 so as to form a loop with the coil axis P as its center, as seen from the vehicle longitudinal direction.

In this embodiment, the coil axis P corresponds to the vehicle longitudinal direction and is approximately parallel to the vehicle longitudinal direction. Thus, the electric wire 91 wound around the iron core 89 has portions 91a extending along the vehicle width direction (vertical direction in FIG. 11) and portions 91b extending along the vehicle vertical direction (direction perpendicular to the page surface of FIG. 11). The portions 91a extending along the vehicle width direction are positioned on both sides of the iron core 89 in the vehicle vertical direction, while the portions 91b extending in the vehicle vertical direction are positioned on both sides thereof in the vehicle width direction.

The iron core 89 is made of a plate-shaped magnetic material, and both ends thereof in the vehicle longitudinal direction include attachment parts 89a and 89b protruding outward in the vehicle width direction. The both ends in the vehicle longitudinal direction including the attachment parts 89a and 89b serve as magnetic poles. The electric wire 91 is wound between the attachment parts 89a and 89b of the iron core 89, which are positioned along the vehicle longitudinal direction, i.e., between the magnetic poles along the vehicle longitudinal direction. The coil main body 221 is attached to the protective housing 222 by means of the attachment parts 89a and 89b.

In the coil main body 221 of the foregoing solenoid type power reception coil 22, as shown in FIG. 11, an amount of magnetic field lines is increased and a magnetic flux M is also increased (becomes larger) around the magnetic poles at both ends of the coil axis P in its extending direction, i.e., at both ends in the vehicle longitudinal direction (left and right ends in FIG. 11). A magnetic flux density around the coil main body 221 is higher in the vicinity of the magnetic poles at both ends along the coil axis P. Note that the magnetic flux generated in the coil main body 221 of the power reception coil 22 is directed not only to the vehicle longitudinal direction but also to the vehicle width direction and the vehicle vertical direction from the magnetic poles.

Here, in this embodiment, as shown in FIG. 8, the bolts B (see FIG. 9) for attaching the power reception coil 22 to the bottom surface of the vehicle body through the attachment parts 22a are disposed to the outside in the vehicle width direction of the coil main body 221 that is the power reception-side coil in the vehicle width direction perpendicular to the coil axis P.

When looking at a peripheral region of the power reception coil 22 from the power transmission coil 12 side during power reception, the amount of magnetic fluxes is smaller in a region outside the coil main body 221 in the direction perpendicular to the coil axis P (outside in the vehicle width direction) than in a region outside the coil main body 221 in the coil axis P direction (outside in the vehicle longitudinal direction). In this embodiment, since the iron bolts B as the magnetic members are disposed in the region with a small amount of magnetic fluxes, eddy currents are less likely to be generated in the bolts B, thereby suppressing heating of the bolts, compared with the case where the bolts B are disposed to the outside of the coil main body 221 in the coil axis P direction.

Note that the use of bolts made of non-magnetic bodies such as aluminum, for example, instead of the iron bolts B can prevent the bolts from being heated by the magnetic flux. However, non-iron metal such as aluminum which is a non-magnetic body is lower in toughness and fatigue durability than iron metal, and is disadvantageous in terms of cost. Therefore, for the fastening members, it is preferable to use the iron bolts B which are excellent in toughness and fatigue durability and are advantageous in terms of cost, compared with non-iron metal such as aluminum.

As shown in FIGS. 2 and 3, at both sides of the front compartment 1F in the vehicle width direction, front side members 50 are provided, which extend in the vehicle longitudinal direction with their rear ends connected to the dash panel 41 and serve as framework members in the front part of the vehicle body.

A sub-frame 51 is provided on the lower side of the front compartment 1F. A motor unit 29U including the inverter 28 and motor 29 described above is mounted and fixed to the sub-frame 51 by means of a mount member 52.

The sub-frame 51 has an approximately rectangular shape in a planar view, and both front and rear ends thereof in the vehicle width direction are connected to lower surfaces of the front and rear ends of the left and right front side members 50, thereby forming the vehicle body framework member on the lower side of the front compartment 1F.

On both sides of the rear end of the sub-frame 51 in the vehicle width direction, extension parts 53 are provided, which extend toward the rear of the vehicle along the both sides of the power reception coil 22 in the vehicle width direction and stiffen the fixed portions of the power reception coil 22 (see FIGS. 7 and 8). In the illustrated example, the extension parts 53 are separately formed into a shape having extension portions provided toward the rear of the vehicle at both ends of a base extending in the vehicle width direction, and the base is jointly fastened and fixed together with the rear end of the sub-frame 51, thereby connecting the extension rear ends to the outriggers 46. However, the extension parts 53 can also be integrally formed with the sub-frame 51.

In such a mounting layout where the battery 27, the power reception coil 22 and the motor unit 29U are arranged in line in the vehicle longitudinal direction, a wire harness 31 for power system is routed along the inside of the tunnel part 42 through above the power reception coil 22, the wire harness 31 being connected to the front end of the battery 27 and the rear end of the motor unit 29U (rear end of the inverter 28) through connectors, and being configured to transmit power from the battery 27 to the motor unit 29U.

The wire harness 31 is routed on the junction box 225, but can also be routed on the side of the junction box 225 in some cases. In this case, the electric component box 224 and the junction box 225 may be shifted to one side with respect to the center position in the tunnel part 42 to secure an installation space for the large-diameter wire harness 31.

On the top wall of the tunnel part 42, a through-hole 47 is provided in a position close to the junction box 225, through which a wire harness 32 for power system is routed. The wire harness 32 transmits power from the battery 27 or the junction box 225 to an interior auxiliary machine 60 such as an air-conditioning unit mounted in the vehicle interior 1R. The through-hole 47 is fitted with a grommet 48 to seal the portion around the harness disposed therethrough.

Figure 10:
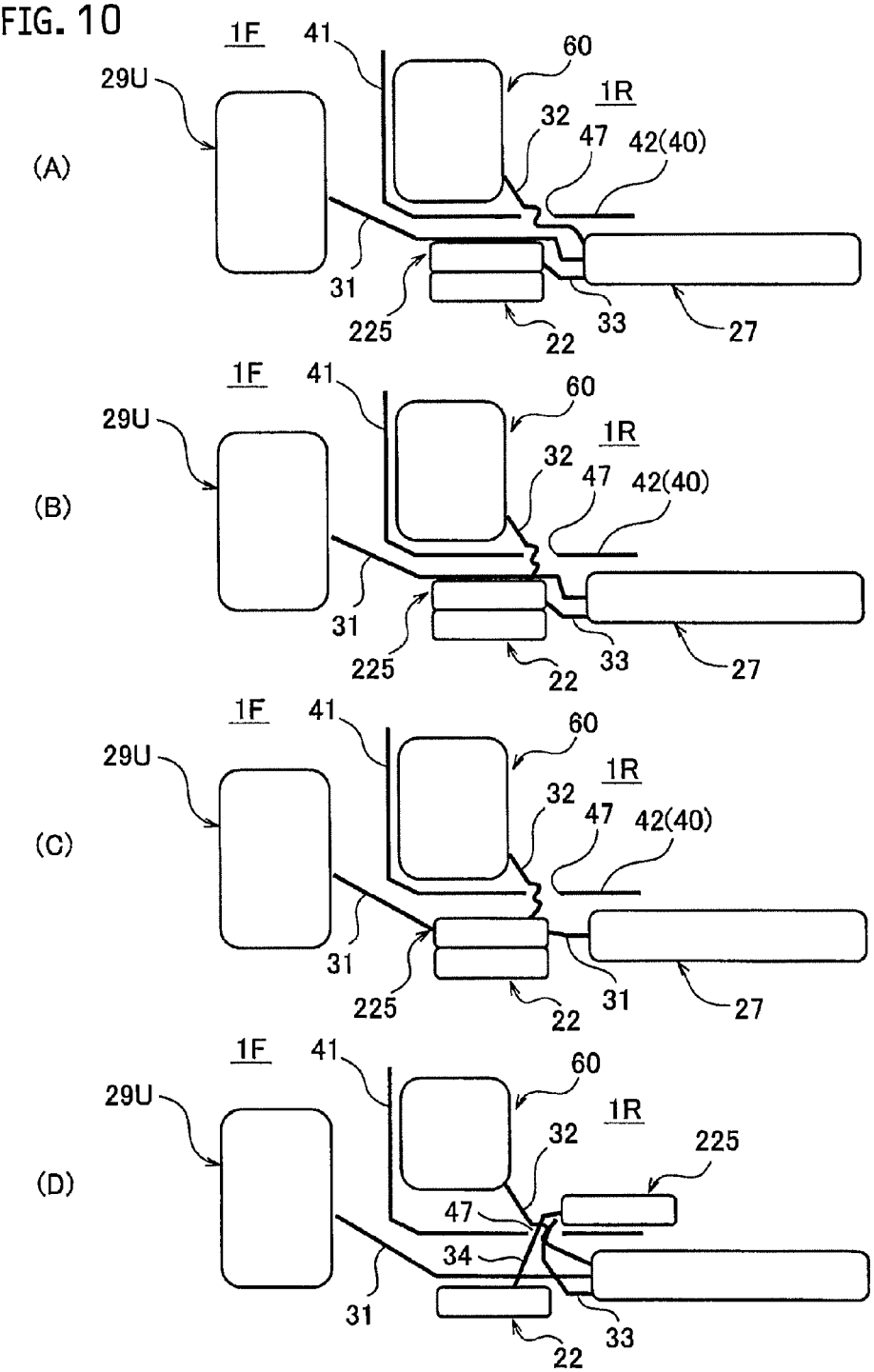
FIG. 10 is an explanatory view schematically showing examples (A) to (D) of a wiring pattern of the battery.

FIG. 10 shows examples (A) to (D) of a power transmission wiring pattern between the battery 27 and the motor unit 29U as well as the interior auxiliary machine 60.

In the example (A), the battery 27 is connected to the motor unit 29U, the interior auxiliary machine 60 and the junction box 225 by wire harnesses 31, 32 and 33, respectively.

In the example (B), the wire harness 32 in the example (A) is connected being branched at the junction box 225, thereby reducing the number of wires from the battery 27 by one.

In the example (C), the wire harness 31 in the example (B) is connected being branched at the junction box 225, thereby omitting the wire harness 33 and reducing the number of wires from the battery 27 by two.

In the example (D), the junction box 225 is separated from the power reception coil 22 and mounted in the vehicle interior, thereby increasing the space in the tunnel part 42. In this example, the wire harness 33 in the example (A) and the wire harness 34 connecting the power reception coil 22 to the junction box 225 are routed through the foregoing through-hole 47 together with the wire harness 32.

In the contactless power feeder according to this embodiment thus configured, the power reception coil 22 is mounted in the center portion in the vehicle width direction on the bottom surface of the front end of the floor panel 40 close to a front wheel W to be steered. Therefore, the vehicle 1 only needs to be steered so as to align the vehicle center with the power transmission coil 12 on the road surface side when parking the vehicle 1 at a predetermined stop position in the parking space 2. The power reception coil 22 can be properly positioned with respect to the power transmission coil 12 to face each other in accordance with a driving sense when doing it. Moreover, since the power reception coil 22 is disposed at a position close to the front wheel W to be steered, the position of the power reception coil 22 can be finely adjusted so as to be aligned with the power transmission coil 12. Thus, the both coils can be more properly positioned so as to face each other.

This configuration eliminates the necessity of providing a dedicated drive control system in which the power transmission coil 12 is made movable using a drive mechanism for the above positioning, and thus has a cost advantage. It also enables positioning the power reception coil 22 with respect to the power transmission coil 12 to face each other by means of a simple operation of the vehicle 1.

Moreover, the power reception coil 22 functions as a protector covering the lower side of the wire harness 31 for power system that transmits power from the battery 27 on the bottom surface of the floor panel 40 to the motor unit 29U in the front compartment 1F. Thus, safety can be improved.

Furthermore, the power reception coil 22 is disposed in the center of the vehicle, and the battery 27, the power reception coil 22 and the motor unit 29U are arranged in the linear mounting layout in the vehicle longitudinal direction. Also, the wire harness 31 described above is routed above the power reception coil 22. Thus, the wire harness 31 can be installed linearly in the planar view, and the harness length can be shortened.

Here, the floor panel 40 described above includes the tunnel part 42 in the vehicle center (center portion in the vehicle width direction). The power reception coil 22 described above is disposed astride the lower-side opening of the tunnel part 42, and the wire harness 31 is routed along the inside of the tunnel part 42.

The power reception coil 22 is a rectangular board-shaped rigid structure in which the coil main body 221 is stored between the protective housing 222 made of metal and the cover 223 made of synthetic resin described above. Thus, the rigidity of the lower-side opening of the tunnel part 42 can be increased to exert a function to prevent dilation deformation (opening). Moreover, the wire harness 31 can be routed in a space having a closed cross-section formed by the power reception coil 22 and the tunnel part 42. Thus, the safety of the wire harness 31 can be further improved.

The power reception coil 22 including the junction box 225 thereon is disposed astride the lower-side opening of the tunnel part 42 as described above, and the junction box 225 is disposed inside the tunnel part 42. Thus, the safety of the junction box 225 can be improved.

Furthermore, since the junction box 225 protruding on the power reception coil 22 is disposed inside the tunnel part 42, an increase in the ground height of the floor panel 40 can be suppressed. Thus, the arrangement has a design advantage in modeling a vehicle body.

In particular, for a hybrid vehicle specification, the junction box 225, formed separately from the power reception coil 22, may be removed from the upper surface of the power reception coil 22 and mounted in the vehicle interior as shown in the example (D) of FIG. 10 to thereby provide sufficient room in the tunnel part 42 for an exhaust pipe to be disposed therein in the longitudinal direction, and thus realizes sharing the lower structure of the vehicle body.

Moreover, the through-hole 47 shared for wirings provided in the top wall of the tunnel part 42 enables the wire harnesses 33 and 34 on the junction box 225 side and the wire harness 32 on the interior auxiliary machine 60 side mounted in the vehicle interior 1R to be routed with the shortest distance. Therefore, the flexibility in wiring layout can be increased, as a matter of course, and the number of the through-holes 47 can be minimized to suppress reduction in tunnel rigidity.

The tunnel part 42 includes the stiffeners 43 with a closed cross-section extending in the vehicle longitudinal direction along the bulging bases on both sides, and the power reception coil 22 is mounted straddling the stiffeners 43. Thus, the attachment rigidity of the power reception coil 22 and the rigidity of the lower-side opening of the tunnel part 42 in the vehicle width direction can be both improved.

Moreover, the width W2 of the power reception coil 22 in the vehicle width direction is set larger than the width W1 of the lower-side opening of the tunnel part 42, and the power reception coil 22 is connected directly to the stiffeners 43 on both sides of the opening. Thus, the attachment rigidity and the rigidity in the vehicle width direction described above can be further improved.

Meanwhile, the motor unit 29U is mounted on the sub-frame 51 that is the framework member disposed on the lower side of the front compartment 1F. Also, on the rear end of the sub-frame 51, the extension parts 53 are provided, which extend toward the rear of the vehicle along the both sides of the power reception coil 22 in the vehicle width direction and stiffen the fixed portions of the power reception coil 22.

Thus, the effect of stiffening the fixed portions of the power reception coil 22 by the extension parts 53 increases the attachment rigidity of the power reception coil 22 against vibration input acting on the fixed portions due to vibration and the like during driving. Moreover, the front side and both left and right sides of the power reception coil 22 can be guarded by the rear end of the sub-frame 51 and the extension parts 53 on both sides thereof, and the rear side of the power reception coil 22 can be guarded by the battery 27.

As a result, the power reception coil 22 can be protected from interference of the road surface and the like, and the effect of protecting the above-described wire harness 31 installed thereabove can be enhanced.

Note that, in the above embodiment, the description is given of the example where the relationship between the width W2 of the power reception coil 22 in the vehicle width direction and the width W1 of the lower-side opening of the tunnel part 42 is set to W1<W2. However, the above relationship can also be set to W1>W2 depending on vehicle specifications. In this case, the power reception coil 22 may be connected astride the lower-side opening of the tunnel part 42 through a bracket.

Second Embodiment

Next, FIGS. 12 to 20 show a vehicle mounting structure of a contactless power reception device according to a second embodiment. Note that the overall configuration of the contactless power feeder shown in FIG. 1 is similarly applied to the second embodiment. A direction indicated by the arrow FR in FIGS. 12 to 20 is the front of the vehicle.

FIGS. 12 to 20 show a mounting state of the power reception coil 22 and the battery 27 shown in FIG. 1 on the vehicle 1, i.e., a vehicle mounting structure of a contactless power reception device in a contactless charger. The power reception coil 22 and the battery 27 described above are mounted under bottom surfaces of a floor panel 470 shown in FIG. 12 and another unillustrated floor panel connected to the rear of the floor panel 470 of the vehicle 1, i.e., under the vehicle body.

Figure 12:
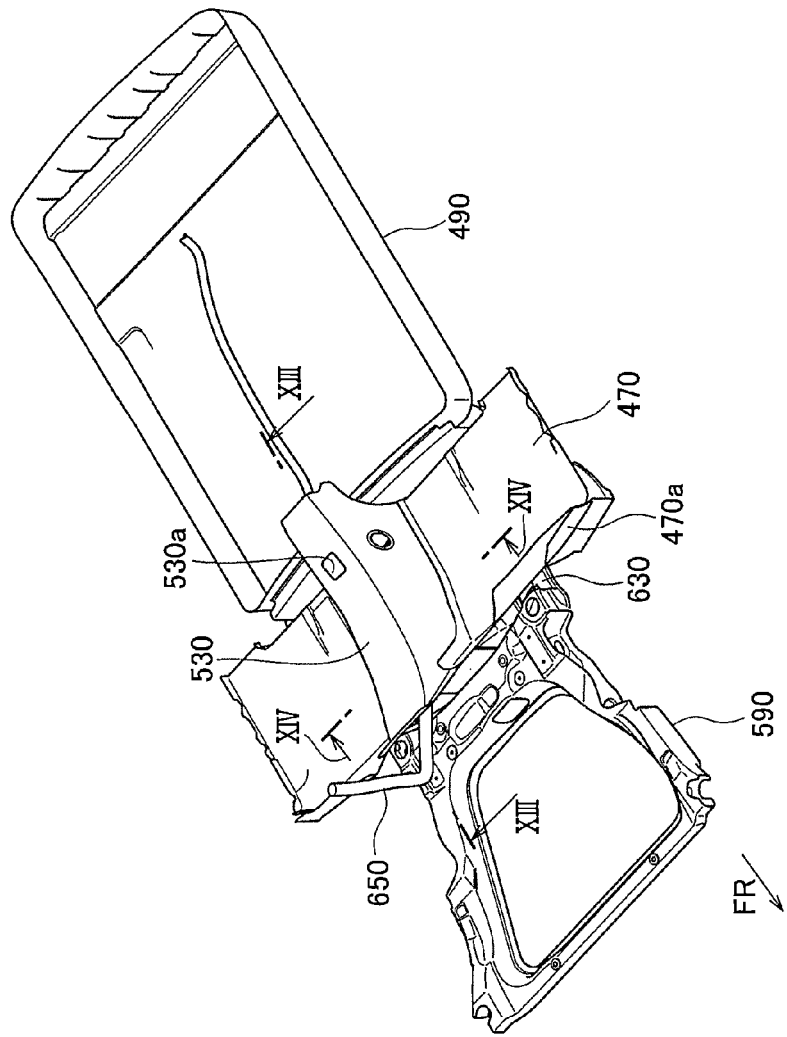
FIG. 12 is a perspective view of a vehicle body lower configuration including a vehicle mounting structure of a contactless power reception device according to a second embodiment of the present invention.

A battery case 490 for housing the battery 27 is disposed below the unillustrated floor panel on the vehicle rear side of the floor panel 470 shown in FIG. 12. Note that the battery case 490 shown in FIG. 12 is a lower case, and an upper opening of the lower case is closed by an unillustrated upper case. The battery case 490 is fastened and fixed from below to vehicle body framework members such as unillustrated side members and cross members.

In the center of the floor panel 470 in the vehicle width direction, a tunnel part 530 is provided, which protrudes upward and extends in the vehicle longitudinal direction. A front end 470a of the floor panel 470 is bent upward to form a dash lower. This dash lower is connected to a lower end of an unillustrated dash upper. A dash panel including the dash upper is a partition member that separates a vehicle interior 550 formed above the floor panel 470 and a front compartment 570 formed on the vehicle front side of the vehicle interior 550 in the vehicle longitudinal direction, as shown in FIG. 13.

A motor unit including the inverter 28 and the motor 29 shown in FIG. 1 is housed in the front compartment 570. The motor unit is attached to a sub-frame 590 shown in FIG. 12 by means of an unillustrated mount member. The sub-frame 590 is formed in an approximately rectangular shape in a planar view, and front and rear ends on both sides thereof in the vehicle width direction are connected to lower surfaces of front and rear ends of unillustrated left and right front side members, thereby forming a vehicle body framework member on the lower side of the front compartment 570. The front side members are vehicle body framework members extending in the vehicle longitudinal direction on both sides in the vehicle width direction.

Figure 15:
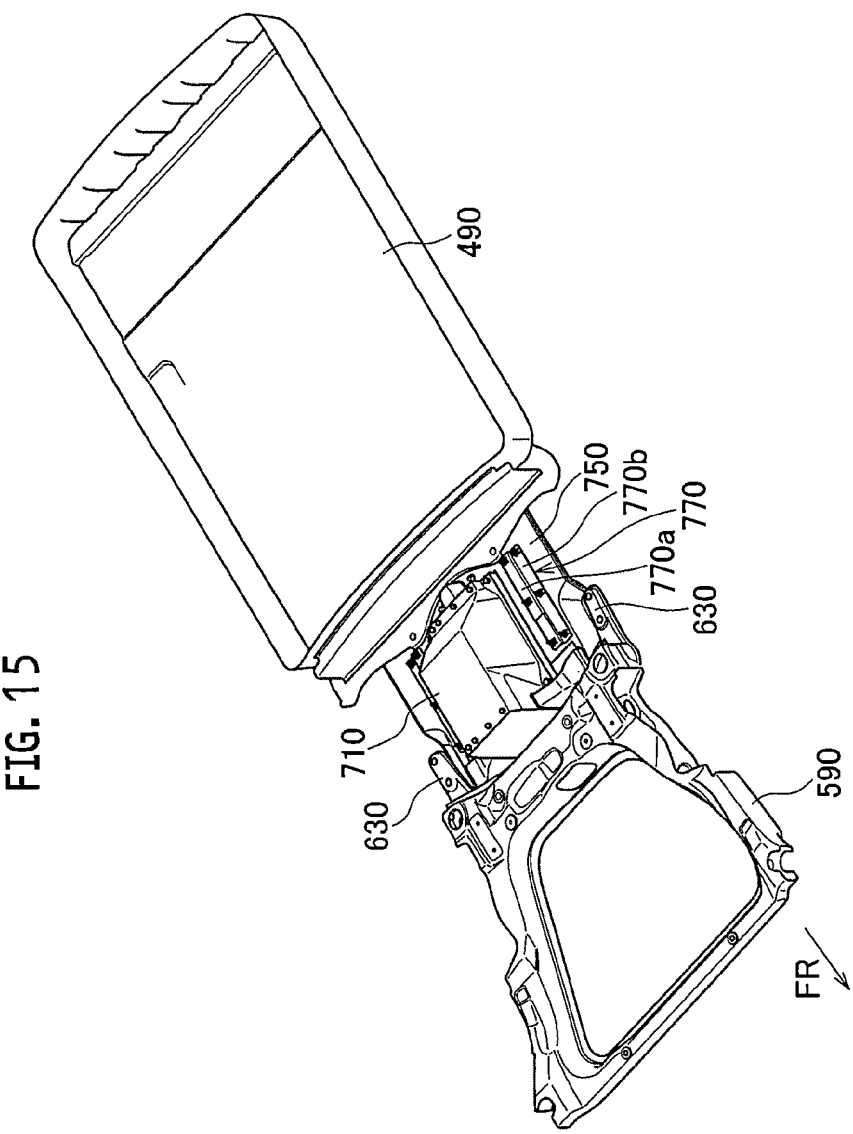
FIG. 15 is a perspective view with a floor panel omitted from FIG. 12.
Figure 16:
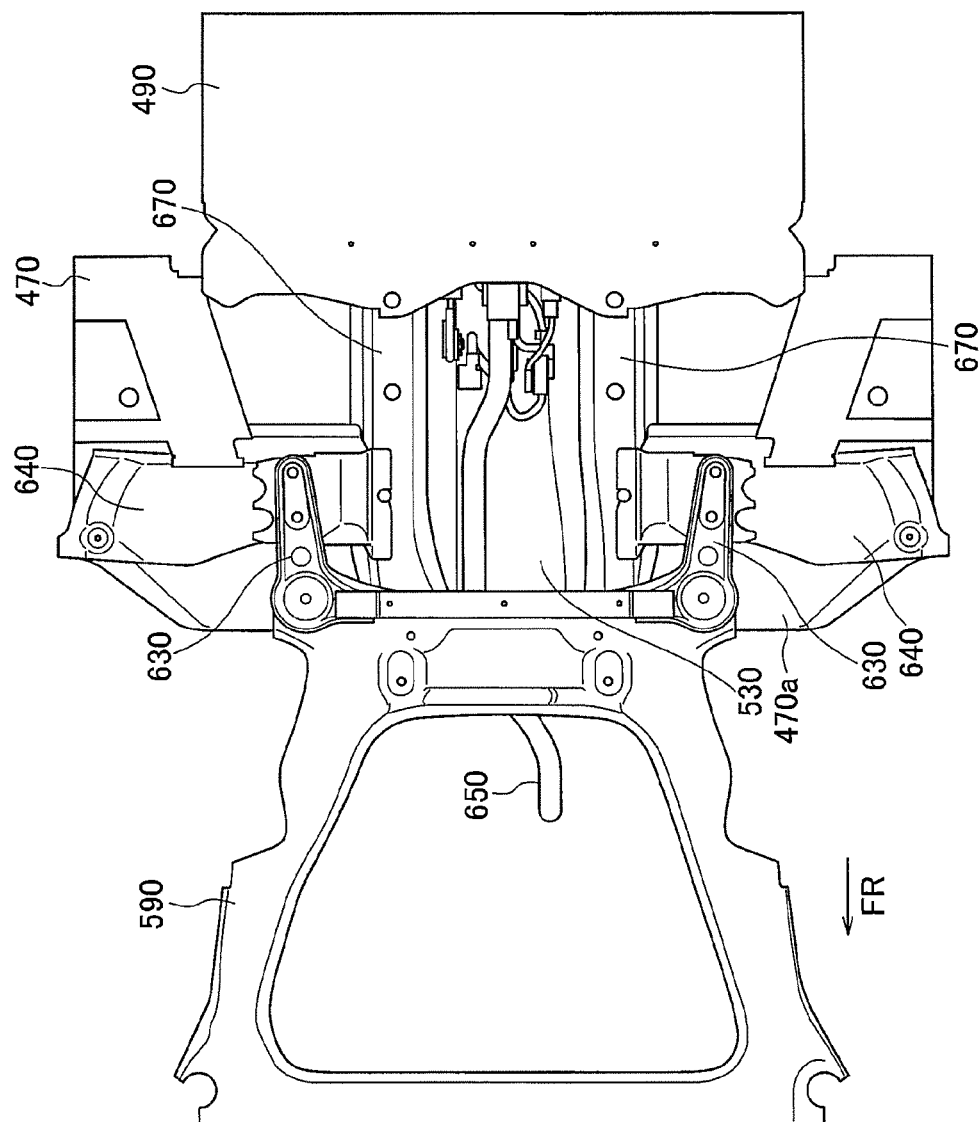
FIG. 16 is a bottom view of the vehicle body, as seen from below, in a state where a shield member, a power reception coil and the like are omitted.

On both sides of the rear end of the sub-frame 590 in the vehicle width direction, extension parts 630 are provided, which extend toward the rear of the vehicle along the both sides of the power reception coil 22 in the vehicle width direction and stiffen the fixed portions of the power reception coil 22 (see FIGS. 15 and 16). The extension parts 630 have their rear ends connected to outriggers 640 shown in FIG. 16. The outriggers 640 are members connecting undermentioned tunnel members 670 (see FIGS. 16 and 18) and unillustrated side sills extending in the vehicle longitudinal direction on both sides of the vehicle width direction. The extension parts 630 may be formed integrally with or separately from the sub-frame 590.

Figure 13:
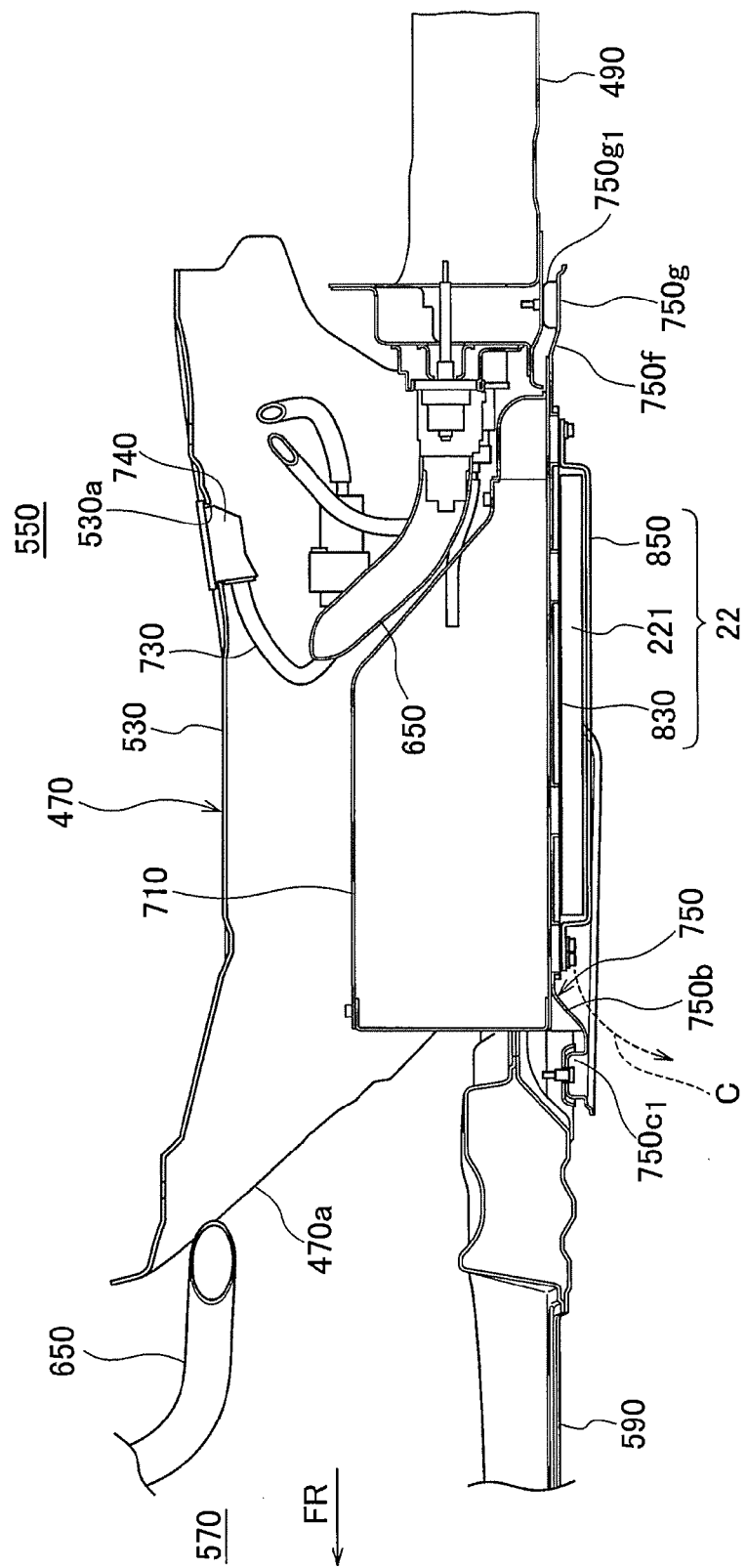
FIG. 13 is a cross-sectional view taken along the line XIII-XIII in FIG. 12.

Here, as shown in FIG. 13, a mounting layout of the battery 27, the power reception coil 22 and the motor unit housed in the front compartment 570 on the vehicle 1 is linear in the vehicle longitudinal direction. Also, a power system wire harness 650 that transmits power from the battery 27 to the motor unit is routed along the inside of the tunnel part 530 with each end of the wire harness 650 connected to the front end of the battery 27 and the rear end of the motor unit (rear end of the inverter 28) through connectors.

The tunnel members 670 to be stiffeners are joined and fixed (see FIGS. 16 and 18) to lower surfaces of both edges of the tunnel part 530 in the vehicle width direction (base portions of the mountain-shaped tunnel part 530). The rigidity of the floor panel 470 is ensured by floor framework members such as the tunnel members 670, the side sills extending in the vehicle longitudinal direction on both sides in the vehicle width direction, unillustrated cross members extending along the vehicle width direction, and the outriggers 640 connecting the tunnel members 670 to the side sills adjacent thereto on the floor front side.

Figure 14:
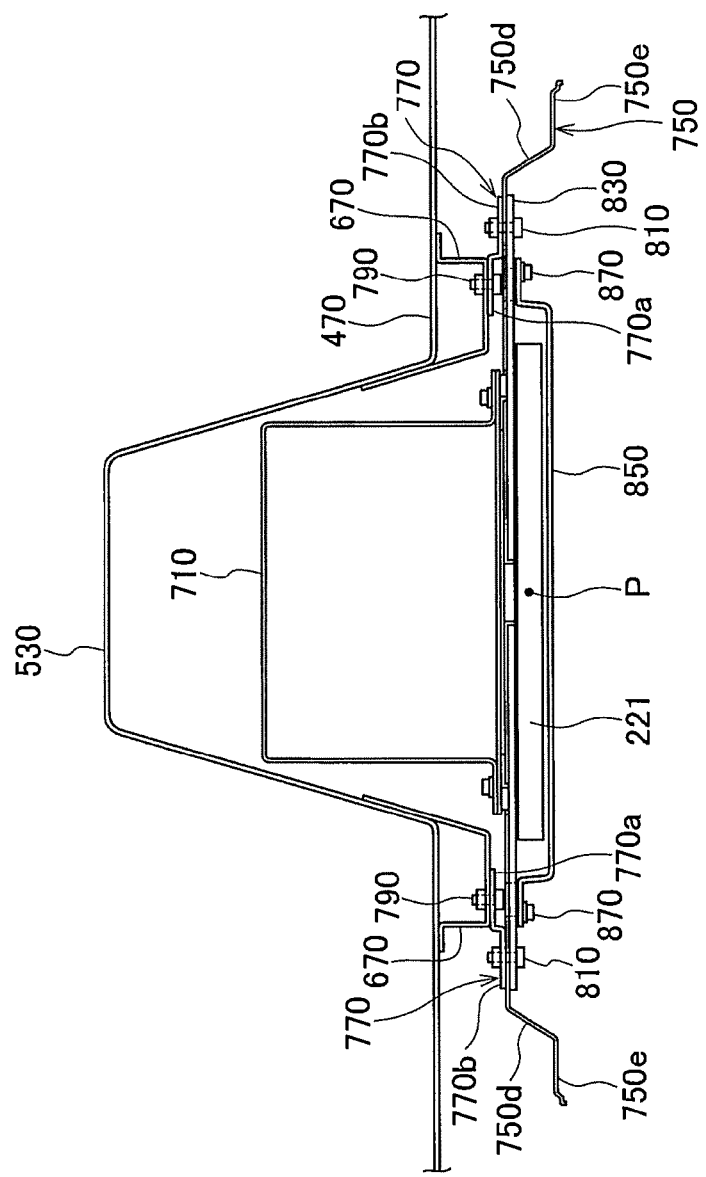
FIG. 14 is a cross-sectional view taken along the line XIV-XIV in FIG. 12.
Figure 18:
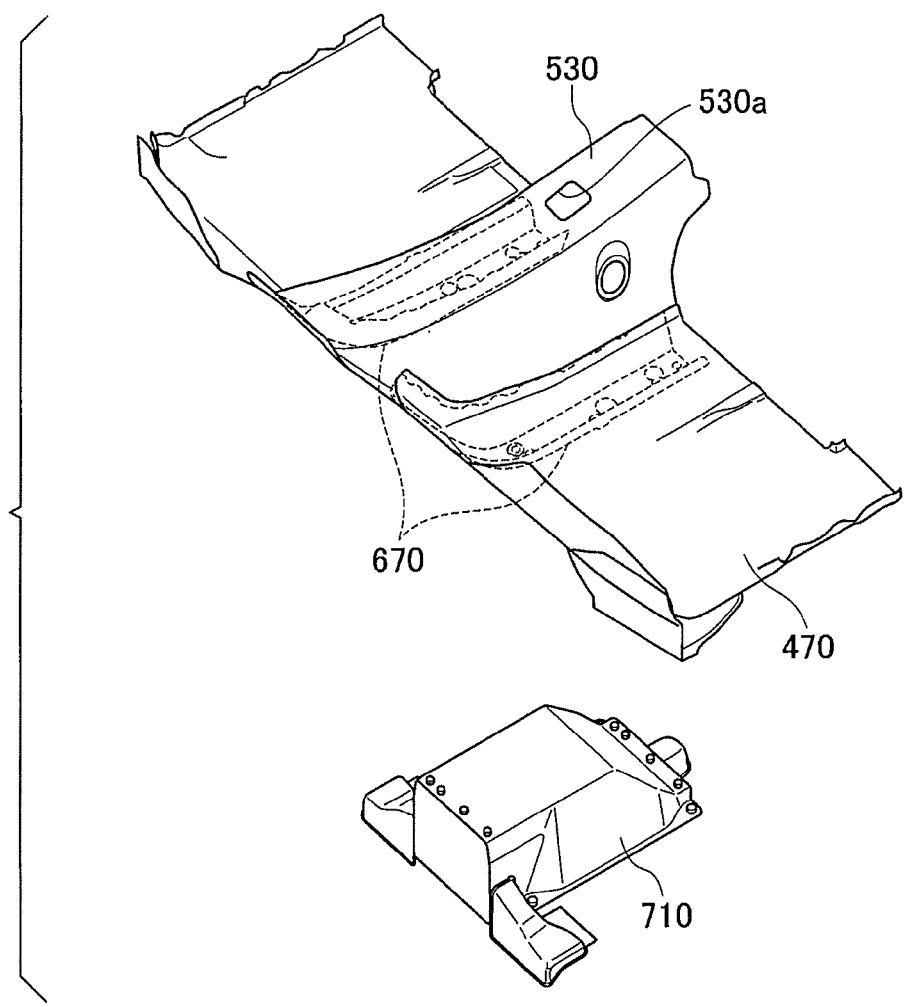
FIG. 18 is an exploded perspective view showing the floor panel shown in FIG. 12 and some of various parts on the floor panel side, which are attached to the lower surface of the floor panel.

Therefore, the large and heavy battery 27 is firmly fastened and fixed to the main framework members such as the side sills and the cross members described above and the tunnel members 670 of the tunnel part 530. As shown in FIGS. 14 and 18, each of the tunnel members 670 has a hat-shaped cross section with an opening in its upper part, and is joined and fixed to the bottom surface of the floor panel at the base of the tunnel part 530 to form a closed cross-section with the floor panel 470.

As shown in FIG. 13, the power reception coil 22 and a junction box 710 positioned on the power reception coil 22 are disposed below the tunnel part 530 in which the wire harness 650 is routed. The junction box 710 houses the charge control unit 24, the rectification unit 25, the relay unit 26 and the like described with reference to FIG. 1.

On the top wall of the tunnel part 530, a through-hole 530a is provided in a position close to the junction box 710, through which a power system wire harness 730 is routed. The wire harness 730 transmits power from the battery 27 or the junction box 710 to an unillustrated interior auxiliary machine such as an air-conditioning unit mounted in the vehicle interior 550. The through-hole 530a is fitted with a grommet 740 to seal the portion around the harness disposed therethrough.

Figure 17:
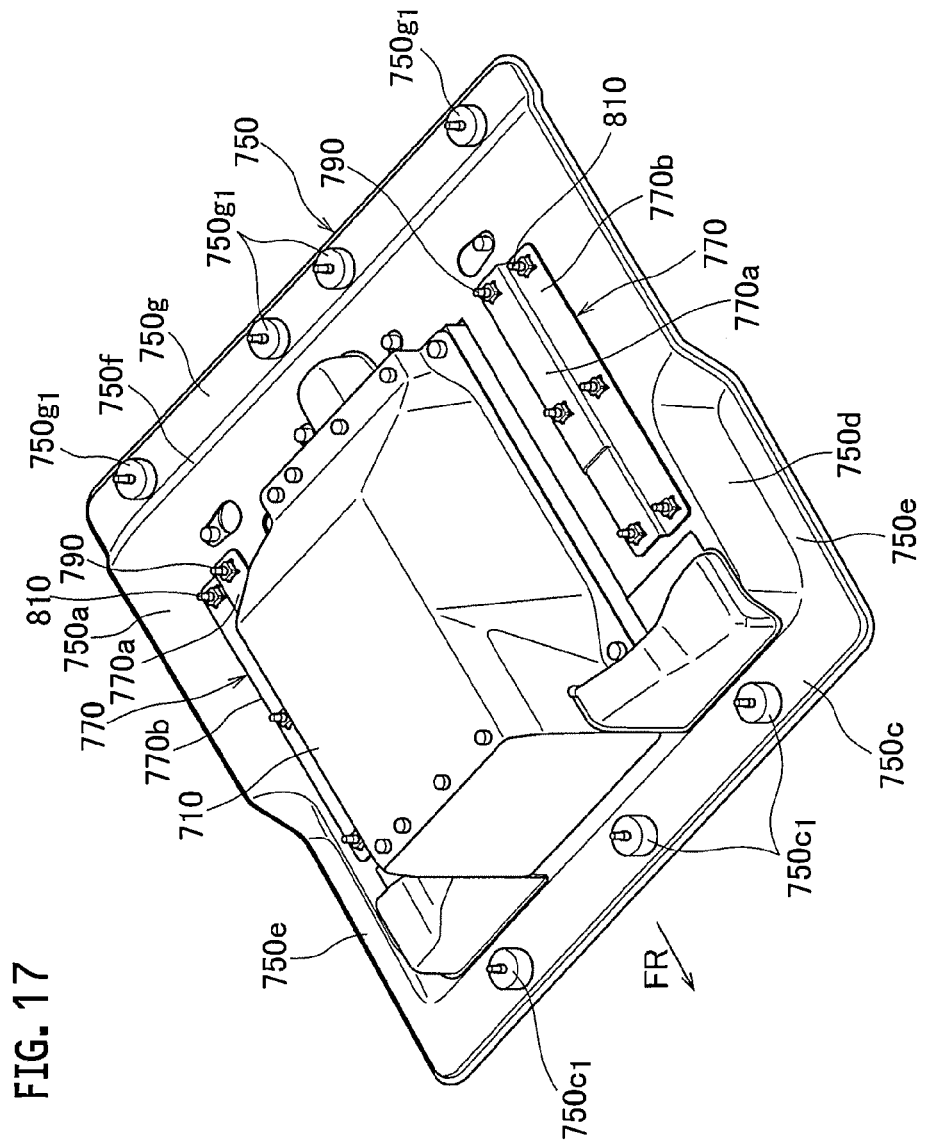
FIG. 17 is a perspective view including a shield member shown in FIG. 15.

As shown in FIGS. 15 and 17, the junction box 710 is attached on a shield member 750 serving as a magnetic shield. The junction box 710 has a width in the vehicle width direction sufficiently smaller than that of the shield member 750 in the same direction, and is positioned inside the tunnel part 530, being surrounded by the inner wall of the tunnel part 530.

The shield member 750 is a plate-shaped member made of aluminum, which is attached to the bottom surfaces of the tunnel members 670 by means of attachment brackets 770 serving as a pair of left and right attachment members shown in FIGS. 14, 15, 17 and 19 so as to close the opening below the tunnel part 530. More specifically, the junction box 710 is housed in a space surrounded by the shield member 750 and the tunnel part 530.

Each of the attachment brackets 770 has a tunnel-side attachment part 770a to be a vehicle body-side attachment part positioned on the inside in the vehicle width direction and a shield member-side attachment part 770b to be a coil-side attachment part bent downward with respect to the tunnel-side attachment part 770a and positioned on the outside in the vehicle width direction. The tunnel-side attachment parts 770a are fastened and fixed to the lower surfaces of the tunnel members 670 with bolts 790, and the shield member-side attachment parts 770b are fastened and fixed to the upper surface of the shield member 750 with bolts 810 serving as fastening members.

Figure 19:
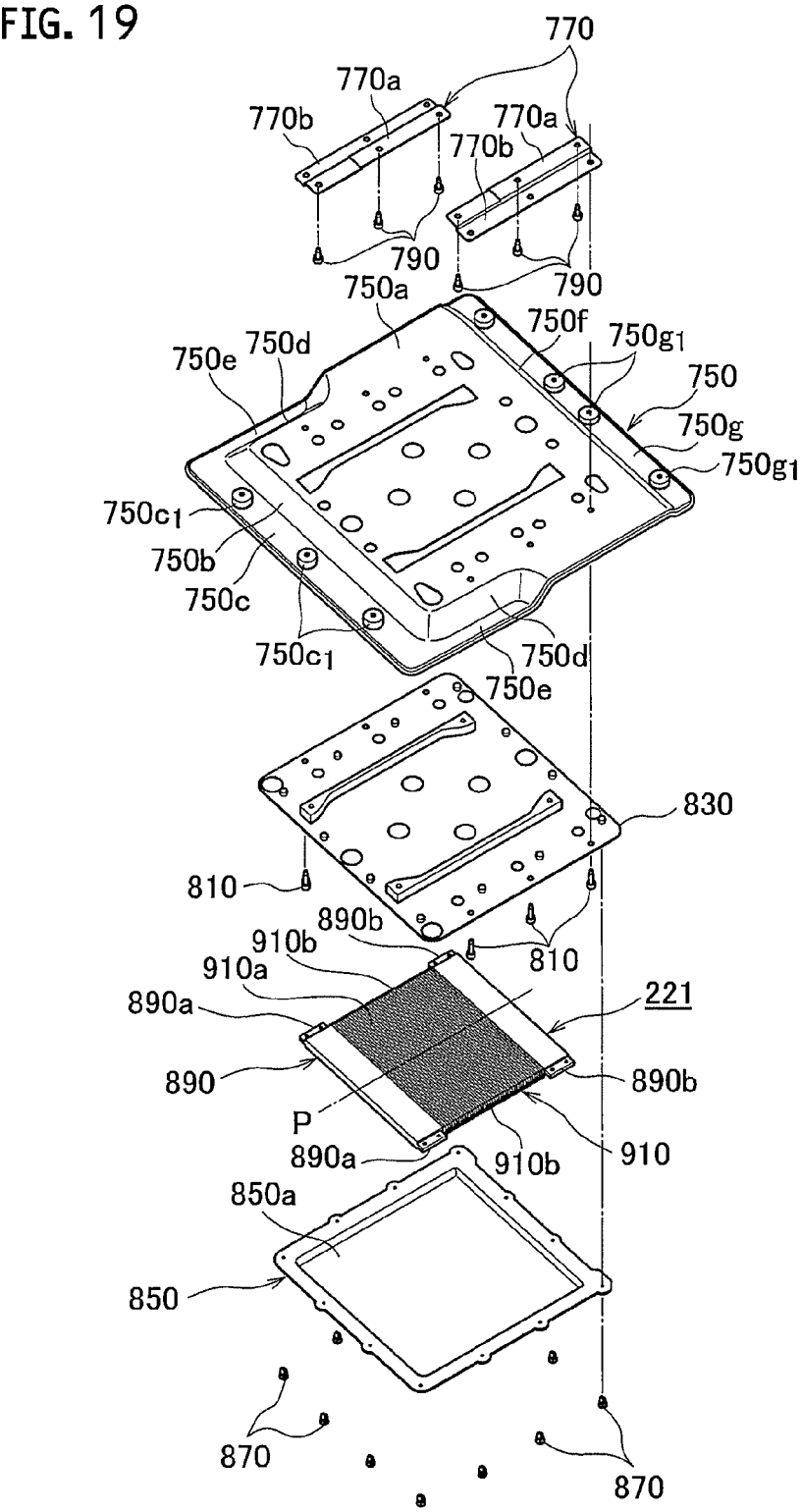
FIG. 19 is an exploded perspective view showing the floor panel shown in FIG. 12 and some of the various parts on the shield member side, which are attached to the lower surface of the floor panel.

For fastening the shield member 750 with the bolts 810, a coil base 830 shown in FIG. 19 is disposed below the shield member 750 as shown in FIG. 14. More specifically, the coil base 830 and the shield member 750 are fastened together to the shield member-side attachment parts 770b of the attachment brackets 770. The coil main body 221 of the power reception coil 22 is attached to the lower surface of the coil base 830. The coil base 830 is a plate-shaped member made of aluminum having a thickness larger than that of the shield member 750, and ensures attachment strength to the tunnel members 670.

Then, a coil cover 850 is fastened and fixed from below, with bolts 870, to the coil base 830 having the coil main body 221 attached to its bottom surface. The coil cover 850 includes a recess 850a that is concave with respect to its outer peripheral portion to receive the coil main body 221 therein. The coil main body 221 is housed between the coil base 830 and the coil cover 850 at a position corresponding to the recess 850a. Therefore, the coil main body 221 is attached to the bottom surface of the vehicle body through the coil base 830. Here, the power reception coil 22 includes the coil main body 221, the coil base 830 and the coil cover 850.

Since the coil cover 850 forms a protective housing wall facing both of the power transmission coil 12 and the power reception coil 22 described above, it is made of synthetic resin so as not to interfere with the electromagnetic induction between the power transmission coil 12 and the power reception coil 22.

Figure 20:
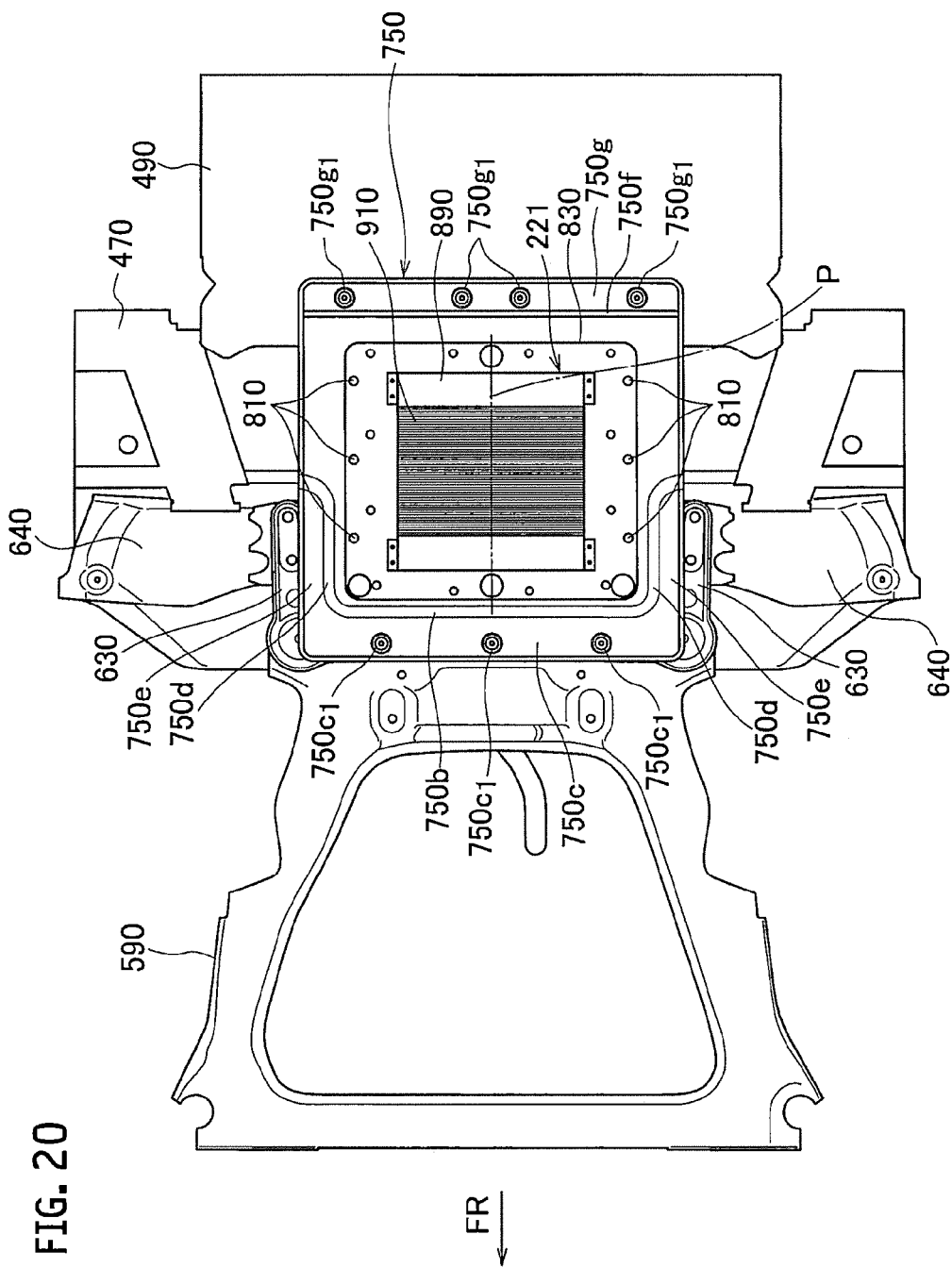
FIG. 20 is a bottom view of the vehicle body, as seen from below, in a state where a coil cover is omitted.

The coil main body 221 is a solenoid type coil, as in the case of the first embodiment, including a plate-shaped iron core 890 and an electric wire 910 wound around the iron core 890, as shown in FIG. 19. FIG. 20 is a view of the vehicle body, as seen from below, in a state where the coil cover 850 is omitted. The coil axis P of the coil main body 221, i.e., the central axis of the looped portion of the electric wire 910 wound in a loop pattern corresponds to the vehicle longitudinal direction. The electric wire 910 is wound around the iron core 890 so as to form a loop as seen from the vehicle longitudinal direction. For example, the electric wire 910 can be wound around the iron core 890 so as to draw a circle (including an oval or ellipse elongated in the vehicle width direction) or a polygon (including a rectangle elongated in the vehicle width direction).

In this embodiment, the coil axis P corresponds to the vehicle longitudinal direction and is approximately parallel to the vehicle longitudinal direction. Therefore, the electric wire 910 wound around the iron core 890 has portions 910*a* extending along the vehicle width direction and portions 910*b* extending along the vehicle vertical direction. The portions 910*a* extending in the vehicle width direction are positioned on both the top and bottom sides of the iron core 890, and the portions 910*b* extending in the vehicle vertical direction are positioned on both sides of the iron core 890 in the vehicle width direction. In this case, the coil axis P can also be defined as a line of intersection of a plane equidistant from the portions 910*a* on both the top and bottom sides and a plane equidistant from the portions 910*b* on both sides in the vehicle width direction.

The iron core 890 is made of a plate-shaped magnetic material, and both ends thereof in the vehicle longitudinal direction include attachment parts 890*a* and 890*b* protruding outward in the vehicle width direction. The both ends in the vehicle longitudinal direction including the attachment parts 890*a* and 890*b* serve as magnetic poles. The electric wire 910 is wound between the attachment parts 890*a* and 890*b* of the iron core 890, which are positioned along the vehicle longitudinal direction, i.e., between the magnetic poles. The coil main body 221 is attached to the coil base 830 by means of the attachment parts 890*a* and 890*b*.

In the solenoid type coil main body 221 as described above, as shown in FIG. 11 described in the first embodiment, an amount of magnetic field lines is increased and a magnetic flux M is also increased (becomes larger) around the magnetic poles at both ends of the coil axis P in its extending direction, i.e., at both ends in the vehicle longitudinal direction (left and right ends in FIGS. 20 and 11). Note that the magnetic flux generated in the coil main body 221 is directed not only to the vehicle longitudinal direction but also to the vehicle width direction and the vehicle vertical direction from the magnetic poles.

For the power reception coil 22 including the coil main body 221 as described above, the shield member 750 described above has a magnetic shield function to shield the magnetic flux generated in the coil main body 221. In the shield member 750, mainly three sides of its periphery on the front side of the vehicle are bent downward with respect to the bracket attachment surface 750*a* to which the shield member-side attachment parts 770*b* of the attachment brackets 770 are attached, as shown in FIG. 19.

More specifically, the shield member 750 has a front inclined surface 750*b* bent downward on the front side of the vehicle. The front inclined surface 750*b* serves as a first wall part provided so as to protrude downward in the coil axis P direction with respect to at least the power reception coil 22.

As shown in FIG. 13, the front inclined surface 750*b* is inclined such that its lower end is positioned more forward in the vehicle front direction than its upper end, and the inclination angle thereof is about 45 degrees with respect to the horizontal surface. On the vehicle front side of the front inclined surface 750*b*, an attachment surface 750*c* is formed, which extends in a direction approximately horizontal to the front of the vehicle. The attachment surface 750*c* is connected to the lower surface of the sub-frame 590 with bolts through circular protrusions 750*c*1 protruding upward.

Moreover, the shield member 750 has side inclined surfaces 750*d* as second wall parts on both sides in the vehicle width direction in approximately half of the region on the front side of the vehicle. The side inclined surfaces 750*d* serve as the second wall parts extending in the direction of the coil axis P of the coil main body 221 from the ends of the first wall part in the vehicle width direction.

The side inclined surfaces 750*d* are inclined such that the lower ends are positioned on the outer side in the vehicle width direction than the upper ends, and the inclination angle thereof is about 45 degrees with respect to the horizontal surface as in the case of the front inclined surface 750*b*. On the outside of the side inclined surfaces 750*d* in the vehicle width direction, horizontal surfaces 750*e* are formed extending approximately horizontally outward in the vehicle width direction. The horizontal surfaces 750*e* are positioned on the same plane continuous with the attachment surface 750*c* on the front side of the vehicle.

Furthermore, the shield member 750 has a rear inclined surface 750*f* on the rear side of the vehicle. The rear inclined surface 750*f* forms the first wall part together with the front inclined surface 750*b*. More specifically, the first wall part has the front inclined surface 750*b* that is a front wall part on the vehicle front side of the power reception coil 22 and the rear inclined surface 750*f* that is a rear wall part on the rear side of the vehicle of the power reception coil 22.

The rear inclined surface 750*f* described above is inclined such that its lower end is positioned more backward in the vehicle rear direction than its upper end, and the inclination angle thereof is about 45 degrees with respect to the horizontal surface. However, a length (height) in the inclination direction between the lower end and the upper end of the rear inclined surface 750*f* is shorter (lower) than a length (height) in the inclination direction of the front inclined surface 750*b* or the side inclined surfaces 750*d*.

On the vehicle rear side of the rear inclined surface 750*f*, an attachment surface 750*g* is formed extending approximately horizontally backward. As shown in FIGS. 13 and 20, the attachment surface 750*g* is connected with bolts to the lower surface of the battery case 490 through circular protrusions 750*g*1 protruding upward. Since the vertical height of the rear inclined surface 750*f* is lower than the front inclined surface 750*b*, the attachment surface 750*g* is positioned above the attachment surface 750*c* on the front side of the vehicle.

In the vehicle mounting structure of the contactless power reception device thus configured, the power reception coil 22 contactlessly receives high-frequency power by the electromagnetic induction between the power reception coil 22 and the power transmission coil 12. In this event, the magnetic flux generated in the power reception coil 22 (coil main body 221) is increased (becomes larger) at the both ends in the coil axis P direction, as described with reference to FIG. 11.

Here, in this embodiment, the bolts 810 for attaching the power reception coil 22 to the bottom surface of the vehicle body are made of iron and serve as fastening members made of magnetic bodies, as in the case of the bolts B in the first embodiment. More specifically, the iron bolts 810 are excellent in toughness and fatigue durability, and are advantageous in terms of cost. Thus, the iron bolts 810 are particularly suitable for firmly attaching the heavy power reception coil 22 including the junction box 710 on top to the bottom surface of the vehicle body.

In this embodiment, the bolts 810 for attaching the power reception coil 22 to the bottom surface of the vehicle body are disposed to the outside (outside in the vehicle width direction) of the coil main body 221 of the power reception coil 22 in a direction perpendicular to the coil axis P.

When looking at a peripheral region (for example, within the area of the shield member 750) of the power reception coil 22 from the power transmission coil 12 side during power reception, the amount of magnetic fluxes is smaller in a region outside the coil main body 221 in the direction perpendicular to the coil axis P (outside in the vehicle width direction) than in a region outside the coil main body 221 in the coil axis P direction (outside in the vehicle longitudinal direction). In this embodiment, since the iron bolts 810 as the magnetic members are disposed in the region with a small amount of magnetic fluxes, eddy currents are less likely to be generated in the bolts 810, thereby suppressing heating of the bolts 810, compared with the case where the bolts 810 are disposed to the outside of the coil main body 221 in the coil axis P direction, even if bolt heads of the bolts 810 are exposed.

Note that the use of bolts made of non-magnetic bodies such as aluminum, for example, instead of the iron bolts 810 can prevent the bolts from being heated by the magnetic flux. However, non-iron metal such as aluminum which is a non-magnetic body is lower in toughness and fatigue durability than iron metal, and is disadvantageous in terms of cost, compared with the iron metal. Therefore, for the fastening members, it is most preferable to use the iron bolts 810 which are excellent in toughness and fatigue durability and are advantageous in terms of cost, compared with non-iron metal such as aluminum.

Moreover, in this embodiment, each of the attachment brackets 770 has the tunnel-side attachment part 770a fixed to the bottom surface of the vehicle body and the shield member-side attachment part 770b fixed with the bolts 810 to the shield member 750 on the power reception coil 22 side. In this configuration, the shield member-side attachment part 770b is disposed at a position further away from the coil axis P of the coil main body 221 in the power reception coil 22 than the tunnel-side attachment part 770a.

Therefore, the iron bolts 810 for fastening the coil base 830 that holds the coil main body 221 to the bottom surface of the vehicle body together with the shield member 750 are positioned on the outer side (outer in the vehicle width direction) in the direction perpendicular to the coil axis P with respect to the coil main body 221, due to the presence of the attachment brackets 770.

As a result, the amount of magnetic fluxes passing through the bolts 810 among those generated in the coil main body 221 of the power reception coil 22 is further reduced. Thus, generation of the eddy currents in the bolts 810 can be more surely suppressed, and heating of the bolts 810 can be more surely suppressed.

Although the embodiments of the present invention have been described above, these embodiments are merely examples described to facilitate the understanding of the present invention and the present invention is not limited to the embodiments. The technical scope of the present invention is not limited to specific technical matters disclosed in the embodiments described above, and includes various modifications, changes, alternative techniques, and the like which can be easily derived therefrom.

Although the iron bolts B and 810 are used as the fastening members in the embodiments described above, for example, thin aluminum films may be formed by aluminum deposition on bolt heads thereof, or a resin cover having its surface aluminum-deposited may be placed thereon. Note that, even when the aluminum deposition part comes off or the aluminum-deposited cover is removed in this case, heating of the bolts B and 810 is suppressed since the bolts B and 810 are disposed in the region where the amount of magnetic fluxes is smaller than in the region outside in the coil axis P direction (in the vehicle longitudinal direction).

This application claims the benefit of priority based on Japanese Patent Application No. 2013-201477 filed on Sep. 27, 2013 and Japanese Patent Application No. 2013-201507 filed on Sep. 27, 2013, the entire contents of which are incorporated herein by reference.

INDUSTRIAL APPLICABILITY

A vehicle mounting structure of a contactless power reception device according to the present invention can suppress a magnetic fastening member from being heated by a magnetic flux generated in a power reception-side coil even when the fastening member for attaching the power reception-side coil to the bottom surface of the vehicle body is made of a magnetic body.

REFERENCE SIGNS LIST

12 power transmission coil (power feeding-side coil)
40, 470 floor panel (vehicle body)
91 electric wire (conductive wire)
221 coil main body of power reception coil (power reception-side coil)
770 attachment bracket (attachment member)
770a tunnel-side attachment part of attachment bracket (vehicle body-side attachment part)
770b shield member-side attachment part of attachment bracket (coil-side attachment part)
B, 810 bolt (fastening member)
P coil axis

The invention claimed is:

1. A vehicle mounting structure of a contactless power reception device, comprising:
 a power reception-side coil configured to be mounted on a bottom surface of a vehicle body and to contactlessly receive power transmitted from a power feeding-side coil, the power reception-side coil having a conductive wire wound with a vehicle longitudinal direction as a coil axis; and
 a fastening member made of a magnetic body to fasten the power reception-side coil to the vehicle body, wherein the fastening member is disposed to an outside of the power reception-side coil in a direction perpendicular to the coil axis, the power reception-side coil is attached to the bottom surface of the vehicle body through an attachment member, the attachment member includes a vehicle body-side attachment part to be fixed to the bottom surface of the vehicle body and a coil-side attachment part to be fixed to the power reception-side coil by the fastening member, and the coil-side attachment part is disposed at a position further away from the coil axis of the power reception-side coil than the vehicle body-side attachment part.

* * * * *